（12）United States Patent
Elazzouni et al.

(10) Patent No.: US 12,520,345 B2
(45) Date of Patent: Jan. 6, 2026

(54) PERSISTENT RESOURCE ACCESS FOR SIDELINK

(71) Applicant: QUALCOMM Incorporated, San Diego, CA (US)

(72) Inventors: Sherif Elazzouni, San Diego, CA (US); Ozcan Ozturk, San Diego, CA (US); Jing Sun, San Diego, CA (US); Qing Li, Princeton Junction, NJ (US); Xiaoxia Zhang, San Diego, CA (US); Junyi Li, Fairless Hills, PA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 750 days.

(21) Appl. No.: 17/825,944

(22) Filed: May 26, 2022

(65) Prior Publication Data

US 2023/0389073 A1   Nov. 30, 2023

(51) Int. Cl.
*H04W 74/0816*   (2024.01)
*H04W 72/0446*   (2023.01)
*H04W 74/08*   (2024.01)
*H04W 76/30*   (2018.01)
*H04W 92/18*   (2009.01)

(52) U.S. Cl.
CPC ... *H04W 74/0816* (2013.01); *H04W 72/0446* (2013.01); *H04W 74/0866* (2013.01); *H04W 76/30* (2018.02); *H04W 92/18* (2013.01)

(58) Field of Classification Search
CPC ......... H04W 74/0816; H04W 72/0446; H04W 74/0866; H04W 76/30; H04W 92/18; H04W 72/25; H04W 72/40; H04W 16/14; H04W 74/0808
See application file for complete search history.

(56) References Cited

U.S. PATENT DOCUMENTS

| | | | | |
|---|---|---|---|---|
| 2020/0037343 | A1* | 1/2020 | He | H04W 72/20 |
| 2020/0404655 | A1* | 12/2020 | Salem | H04W 16/14 |
| 2022/0330267 | A1* | 10/2022 | Hui | H04W 72/56 |
| 2023/0131345 | A1* | 4/2023 | Lin | H04W 16/14 |
| | | | | 370/329 |
| 2023/0309145 | A1* | 9/2023 | Chen | H04W 74/0816 |
| 2024/0276549 | A1* | 8/2024 | Freda | H04W 74/0875 |

* cited by examiner

*Primary Examiner* — Sharmin Chowdhury
(74) *Attorney, Agent, or Firm* — Holland & Hart LLP

(57) ABSTRACT

Methods, systems, and devices for wireless communications are described. A user equipment (UE) may transmit a first sidelink signal indicating a set of resources that are reserved at the UE for sidelink communications. The UE may perform multiple listen-before-talk (LBT) procedures using respective consecutive slots of the set of resources. The UE may transmit another sidelink signal using a portion of the set of resources following the multiple LBT procedures. The UE may release a remaining portion of the set of resources after transmitting the second sidelink signal. Another UE may receive the first sidelink signal including the indication of the set of resources. The other UE may detect the remaining portion of the set of resources that may be available for the other UE to use for first sidelink communications based on overbooking at the UE.

30 Claims, 16 Drawing Sheets

PERSISTENT RESOURCE ACCESS FOR SIDELINK

FIELD OF TECHNOLOGY

The following relates to wireless communications, including persistent resource access for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). Some wireless communications systems may support communications over (e.g., using) an unlicensed radio frequency spectrum, in which a communication device may perform a channel access procedure to gain access to resources of the unlicensed radio frequency spectrum for the wireless communication. In some cases, existing techniques for gaining access to resources of the unlicensed radio frequency spectrum may be deficient.

SUMMARY

The described techniques relate to improved methods, systems, devices, and apparatuses that support persistent resource access for sidelink. For example, the described techniques provide a framework for overbooking resources of an unlicensed radio frequency spectrum to transmit sidelink communications. In some examples, a user equipment (UE) may transmit a sidelink signal including an indication of a set of resources that are reserved at the UE for sidelink communications. The UE may perform two or more listen-before-talk (LBT) procedures using respective consecutive slots (or minislots) of the set of resources. That is, the UE may maintain a persistent reservation of the set of resources and continue performing one or more LBT procedures for the set of resources following an initial LBT failure. For example, the UE may perform a second LBT procedure based on a failure of a first LBT procedure for the set of resources. The UE may transmit another sidelink signal using a portion of the set of resources following the two or more LBT procedures. The UE may release a remaining portion of the set of resources after transmitting the second sidelink signal, and another UE may perform at least one LBT procedure to access and transmit over the remaining portion of the set of resources. As a result, the UE may increase system capacity and resource utilization within a wireless communications system, among other possible benefits.

A method for wireless communication at a UE is described. The method may include transmitting a first sidelink signal including an indication of a set of resources that are reserved by the UE for sidelink communications, performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures, and transmitting a second sidelink signal over a portion of the set of resources following the at least two LBT procedures, where a remaining portion of the set of resources is released after transmitting the second sidelink signal, the remaining portion following transmission of the second sidelink signal.

An apparatus for wireless communication at a UE is described. The apparatus may include a processor, memory coupled with the processor, and instructions stored in the memory. The instructions may be executable by the processor to cause the apparatus to transmit a first sidelink signal including an indication of a set of resources that are reserved by the UE for sidelink communications, perform at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures, and transmit a second sidelink signal over a portion of the set of resources following the at least two LBT procedures, where a remaining portion of the set of resources is released after transmitting the second sidelink signal, the remaining portion following transmission of the second sidelink signal.

Another apparatus for wireless communication at a UE is described. The apparatus may include means for transmitting a first sidelink signal including an indication of a set of resources that are reserved by the UE for sidelink communications, means for performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures, and means for transmitting a second sidelink signal over a portion of the set of resources following the at least two LBT procedures, where a remaining portion of the set of resources is released after transmitting the second sidelink signal, the remaining portion following transmission of the second sidelink signal.

A non-transitory computer-readable medium storing code for wireless communication at a UE is described. The code may include instructions executable by a processor to transmit a first sidelink signal including an indication of a set of resources that are reserved by the UE for sidelink communications, perform at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures, and transmit a second sidelink signal over a portion of the set of resources following the at least two LBT procedures, where a remaining portion of the set of resources is released after transmitting the second sidelink signal, the remaining portion following transmission of the second sidelink signal.

In some examples of the method, apparatuses, and non-transitory computer-readable medium described herein, transmitting the first sidelink signal may include operations, features, means, or instructions for transmitting, via the first sidelink signal, SCI including a first TDRA corresponding to the second sidelink signal and an overbooking indication, where the performing the at least two LBT procedures may be based at least in part on the overbooking indication.

In some examples of the method, apparatuses, and non-transitory computer-readable medium described herein, the overbooking indication includes a persistence ratio indicating a ratio between a second TDRA corresponding to an entirety of the set of resources and the first TDRA corresponding to the second sidelink signal.

In some examples of the method, apparatuses, and non-transitory computer-readable medium described herein, the persistence ratio may be based on a historical LBT failure rate associated with the UE.

In some examples of the method, apparatuses, and non-transitory computer-readable medium described herein, the historical LBT failure rate may be based on a CBR associated with one or more of sidelink signals from one or more other UEs.

In some examples of the method, apparatuses, and non-transitory computer-readable medium described herein, the UE may be associated with a first RAT and the CBR may be adjusted to exclude traffic from RATs other than the first RAT.

In some examples of the method, apparatuses, and non-transitory computer-readable medium described herein, the overbooking indication includes a second TDRA corresponding to an entirety of the set of resources.

In some examples of the method, apparatuses, and non-transitory computer-readable medium described herein, the performing the at least two LBT procedures may be further based on a HARQ state associated with the second sidelink signal.

In some examples of the method, apparatuses, and non-transitory computer-readable medium described herein, the first LBT procedure occurs at a first temporal distance from a first slot boundary of a first slot of the set of resources and the second LBT procedure occurs at a second temporal distance from a second slot boundary of a second slot of the set of resources subsequent to the first slot and the second temporal distance may be greater than the first temporal distance.

Some examples of the method, apparatuses, and non-transitory computer-readable medium described herein may further include operations, features, means, or instructions for transmitting a CPE subsequent to the second LBT procedure and prior to a beginning slot of the second sidelink signal based on a success of the second LBT procedure.

In some examples of the method, apparatuses, and non-transitory computer-readable medium described herein, the first LBT procedure occurs over a first contention window and the second LBT procedure occurs over a second contention window, the first contention window being longer than the second contention window.

A method for wireless communication at a first UE is described. The method may include receiving, from a second UE, a sidelink signal including an indication of a set of resources that are reserved by the second UE for second sidelink communications, monitoring the set of resources based on the indication, detecting a portion of available resources of the set of resources based on the monitoring, where the portion of available resources are available for the first UE to use for first sidelink communications based on overbooking by the second UE, and where the portion of available resources follow an end of the second sidelink communications by the second UE, and performing at least one LBT procedure over the portion of available resources based on the detecting.

An apparatus for wireless communication at a first UE is described. The apparatus may include a processor, memory coupled with the processor, and instructions stored in the memory. The instructions may be executable by the processor to cause the apparatus to receive, from a second UE, a sidelink signal including an indication of a set of resources that are reserved by the second UE for second sidelink communications, monitor the set of resources based on the indication, detect a portion of available resources of the set of resources based on the monitoring, where the portion of available resources are available for the first UE to use for first sidelink communications based on overbooking by the second UE, and where the portion of available resources follow an end of the second sidelink communications by the second UE, and perform at least one LBT procedure over the portion of available resources based on the detecting.

Another apparatus for wireless communication at a first UE is described. The apparatus may include means for receiving, from a second UE, a sidelink signal including an indication of a set of resources that are reserved by the second UE for second sidelink communications, means for monitoring the set of resources based on the indication, means for detecting a portion of available resources of the set of resources based on the monitoring, where the portion of available resources are available for the first UE to use for first sidelink communications based on overbooking by the second UE, and where the portion of available resources follow an end of the second sidelink communications by the second UE, and means for performing at least one LBT procedure over the portion of available resources based on the detecting.

A non-transitory computer-readable medium storing code for wireless communication at a first UE is described. The code may include instructions executable by a processor to receive, from a second UE, a sidelink signal including an indication of a set of resources that are reserved by the second UE for second sidelink communications, monitor the set of resources based on the indication, detect a portion of available resources of the set of resources based on the monitoring, where the portion of available resources are available for the first UE to use for first sidelink communications based on overbooking by the second UE, and where the portion of available resources follow an end of the second sidelink communications by the second UE, and perform at least one LBT procedure over the portion of available resources based on the detecting.

Some examples of the method, apparatuses, and non-transitory computer-readable medium described herein may further include operations, features, means, or instructions for selecting the set of resources based on a received power associated with the sidelink signal satisfying a threshold for reserving overbooked resources, where monitoring the set of resources may be based on the selection.

Some examples of the method, apparatuses, and non-transitory computer-readable medium described herein may further include operations, features, means, or instructions for selecting the set of resources may be further based on the set of resources including resources that may be overbooked by the second UE.

In some examples of the method, apparatuses, and non-transitory computer-readable medium described herein, receiving the sidelink signal may include operations, features, means, or instructions for receiving, via the sidelink signal, SCI including a first TDRA corresponding to the second sidelink communications by the second UE and an overbooking indication, where detecting the portion of available resources may be based on the SCI.

In some examples of the method, apparatuses, and non-transitory computer-readable medium described herein, the overbooking indication includes a persistence ratio indicating a ratio between a second TDRA corresponding to an entirety of the set of resources and the first TDRA corresponding to the second sidelink communications by the second UE.

In some examples of the method, apparatuses, and non-transitory computer-readable medium described herein, the overbooking indication includes a second TDRA corresponding to an entirety of the set of resources.

Some examples of the method, apparatuses, and non-transitory computer-readable medium described herein may further include operations, features, means, or instructions for performing the at least one LBT procedure may be based on a HARQ state associated with a second sidelink signal to be transmitted by the first UE.

In some examples of the method, apparatuses, and non-transitory computer-readable medium described herein, performing the at least one LBT procedure may include operations, features, means, or instructions for performing a second LBT procedure of the at least one LBT procedure based on a failure of a first LBT procedure of the at least one LBT procedure, where the first LBT procedure and the second LBT procedure may be performed over respective consecutive slots, each slot of the respective consecutive slots including at least one resource of the portion of available resources.

In some examples of the method, apparatuses, and non-transitory computer-readable medium described herein, the first LBT procedure occurs at a first temporal distance from a first slot boundary of a first slot of the portion of available resources and the second LBT procedure occurs at a second temporal distance from a second slot boundary of a second slot of the portion of available resources subsequent to the first slot and the second temporal distance may be greater than the first temporal distance.

Some examples of the method, apparatuses, and non-transitory computer-readable medium described herein may further include operations, features, means, or instructions for transmitting a CPE subsequent to the second LBT procedure and based on a success of the second LBT procedure.

In some examples of the method, apparatuses, and non-transitory computer-readable medium described herein, the first LBT procedure occurs over a first contention window and the second LBT procedure occurs over a second contention window, the first contention window being longer than the second contention window.

DETAILED DESCRIPTION

Figure 1:
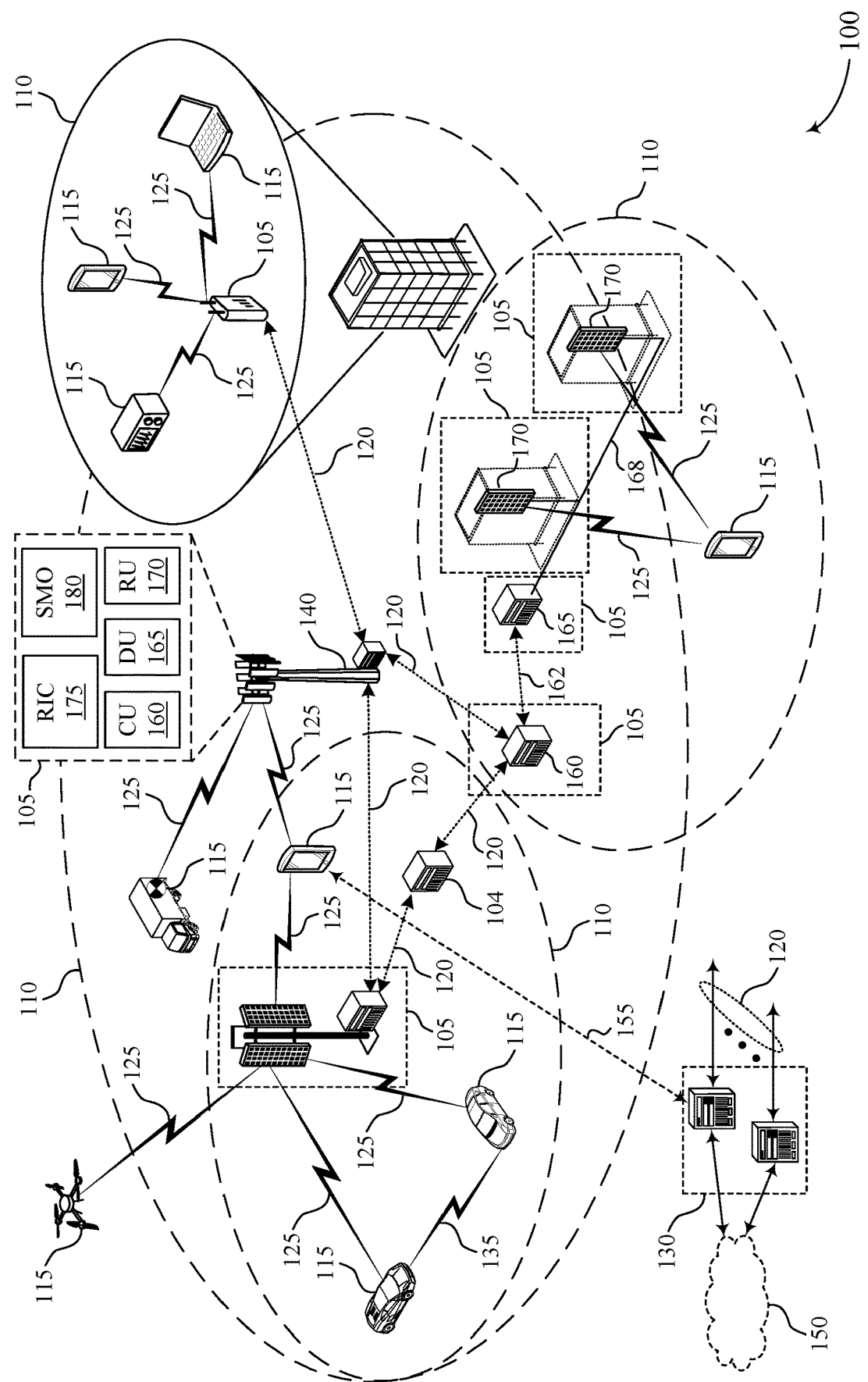
FIGS. 1 and 2A each illustrate an example of a wireless communications system that supports persistent resource access for sidelink in accordance with one or more aspects of the present disclosure.

Some wireless communications systems may include communication devices, such as user equipments (UEs) or network entities, that support wireless communications using one or more radio access technologies (RATs). For example, the communication devices may support wireless communications using one or multiple cellular RATs, such as fourth generation (4G) systems (e.g., Long Term Evolution (LTE) systems), and fifth generation (5G) systems, which may be referred to as NR systems. In some examples, the wireless communications system may support sidelink communications (e.g., using one or more cellular RATs) over (e.g., using) an unlicensed radio frequency spectrum (e.g., an unlicensed spectrum, an unlicensed band) that may be shared with one or more other RATs, such as Wi-Fi, or Bluetooth, or both, among other examples. In such examples, prior to transmitting sidelink communications using the unlicensed spectrum, a sidelink device (e.g., a UE performing wireless communications using a sidelink supported using a cellular RAT) may perform a channel sensing procedure (e.g., during a channel sensing window) to identify a quantity of resources of the unlicensed spectrum that may be available for transmitting sidelink communications. Based on the channel sensing procedure, the UE may transmit an indication (e.g., a reservation announcement, such as using sidelink control information (SCI)) of one or more resources (e.g., of the quantity of resources determined to be available at the UE) that the UE intends to use (e.g., reserved) for transmitting the sidelink communications.

In some examples, however, other communication devices operating using other RATs (e.g., Wi-Fi or Bluetooth) may not decode the reservation announcement transmitted from the UE and, as such, may transmit communications using the resources reserved at the UE (e.g., the resources indicated from the UE using the reservation announcement). In such examples, a channel access procedure (e.g., a listen-before-talk (LBT) procedure) performed at the UE using the reserved resources (e.g., to gain access to the channel for transmitting the sidelink communications) may fail due to the resources being occupied with signals transmitted from the other communication devices. In such an example, the UE may not be capable of gaining access to the channel and sidelink communications within the wireless communications system may be degraded.

Various aspects of the present disclosure generally relate to techniques for persistent resource access for sidelink, and more specifically, to a framework for overbooking resources of the unlicensed spectrum to transmit sidelink communications. For example, a UE may reserve more sidelink resources (e.g., time domain and frequency domain resources) than what the UE expects to use to transmit a sidelink communication. This overbooking may enable the UE to still be able to transmit the sidelink communication during the reserved sidelink resources following an initial failure to gain access to the reserved resources via LBT. For example, if the UE fails an LBT procedure in a first slot or minislot of the reserved resources (e.g., due to another communication device using another RAT occupying the reserved resources), the UE may perform another LBT procedure using another (e.g., subsequent) slot or minislot of the reserved resources. In some examples, the UE may continue to perform LBT procedures until either an LBT procedure is successful or the UE fails to access (e.g., the LBT procedure fails for) each of the resources overbooked at the UE. Additionally, or alternatively, if one or more of the overbooked resources are not used by the UE, the UE may release the overbooked resources for use by other UE (e.g., other sidelink devices).

In some examples, the UE may overbook resources according to a persistence ratio (e.g., a persistence factor) that indicates a ratio between a time domain resource allocation (TDRA) corresponding to an entirety of the set of resources reserved at the UE and a TDRA corresponding to the resources to be used at the UE for transmitting sidelink communications. As described herein, resources overbooked at the UE (e.g., according to the persistence ratio) may be referred to as persistent resources. The persistence ratio may, in some examples, be adapted (e.g., increased or decreased) at the UE based on congestion within the wireless communications system (e.g., historical LBT failures experienced at the UE). Additionally, or alternatively, the UE may communicate the persistence ratio to other UEs using an overbooking indication (e.g., included in SCI).

Particular aspects of the subject matter described herein may be implemented to realize one or more of the following potential advantages. The techniques employed by the described communication devices may provide benefits and enhancements to the operation of the communication devices, including enabling a framework for overbooking resources of an unlicensed spectrum to transmit sidelink communications. Further, techniques for persistent resource access for sidelink, as described herein, may support increased data rates, one or more spectrum efficiency enhancements, and increased resource utilization, thereby improving throughput and reliability within a wireless communications system. Such techniques may lead to improved network operations and network work efficiencies, among other benefits.

Aspects of the disclosure are initially described in the context of wireless communications systems. Aspects of the disclosure are also described in the context of a timing diagram, channel access schemes, a channel access procedure, a control information format, a resource allocation diagram, a resource reservation scheme, and process flows. Aspects of the disclosure are further illustrated by and described with reference to apparatus diagrams, system diagrams, and flowcharts that relate to persistent resource access for sidelink.

FIG. 1 illustrates an example of a wireless communications system 100 that supports persistent resource access for sidelink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) throughout which the UEs 115 and the network entity 105 may establish one or more communication links 125. The coverage area 110 may be an example of a geographic area throughout which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point (AP), a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, stand-alone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support persistent resource access for sidelink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station (STA), a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, in which case $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple minislots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a minislot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a particular UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, of the wireless communications system 100, a UE 115 may overbook resources of an unlicensed radio frequency spectrum that may be shared between multiple (e.g., different) RATs. For example, the UE 115 may transmit a sidelink signal including an indication of a set of resources that are reserved at the UE 115 for sidelink communications. The UE 115 may perform two or more LBT procedures using respective consecutive slots (or minislots) of the set of resources. For example, the UE 115 may perform a second LBT procedure based on a failure of a first LBT. The UE 115 may transmit another sidelink signal using a portion of the set of resources following the two or more LBT procedures. The UE 115 may release a remaining portion of the set of resources after transmitting the second sidelink signal, the remaining portion following transmission of the second sidelink signal.

Additionally, or alternatively, another UE 115 may receive, from the UE 115, the sidelink signal including the indication of the set of resources that are reserved at the UE 115 for the sidelink communications. The other UE 115 may monitor the set of resources based on the indication. In some examples, the other UE 115 may detect a portion of available resources of the set of resources based on the monitoring. The portion of available resources may be available for the other UE 115 to use for first sidelink communications based on overbooking at the UE 115. For example, the portion of available resources follow an end of the sidelink communications at the UE 115. The other UE 115 may perform at least one LBT procedure using the portion of available resources based on the detecting. Therefore, releasing the remaining resources of the set of resources reserved at the UE 115 may increase system capacity and resource utilization within the wireless communications system 100, among other possible benefits.

Figure 2A:
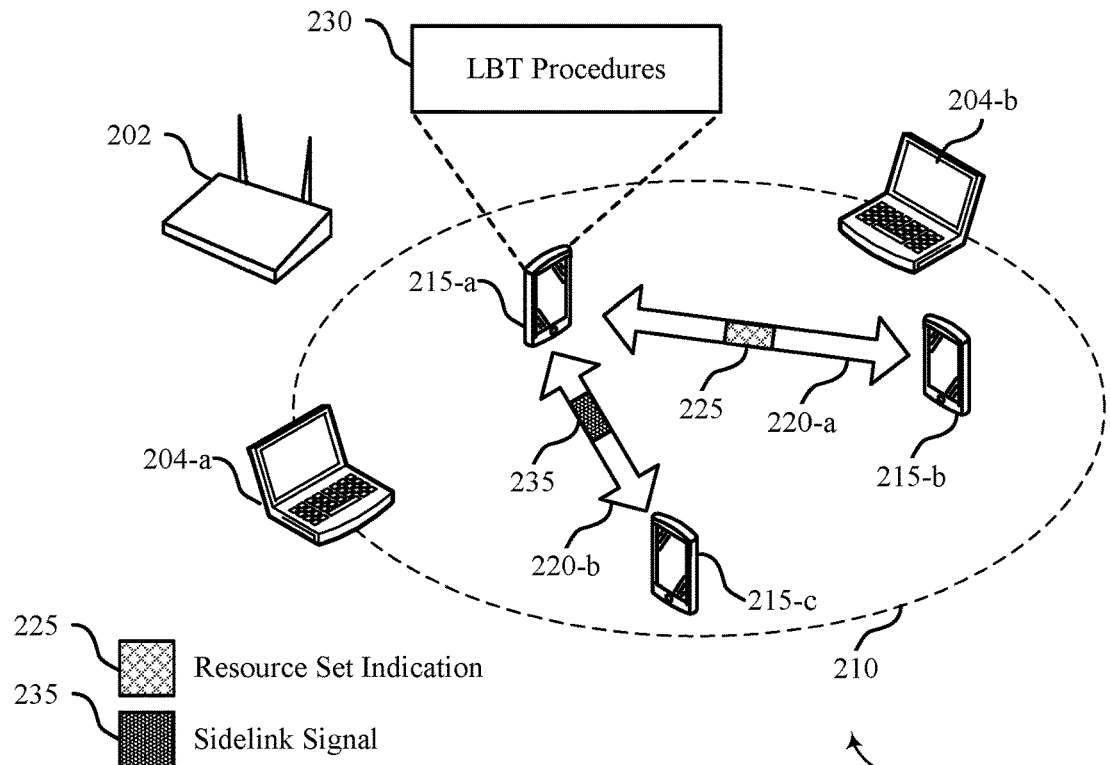

FIG. 2A illustrates an example of a wireless communications system 200 that supports persistent resource access for sidelink in accordance with one or more aspects of the present disclosure. In some examples, the wireless communications system 200 may implement aspects of wireless communications system 100. For example, the wireless communications system 200 may include one or more UEs 215 (e.g., a UE 215-*a*, a UE 215-*b*, and a UE 215-*c*), which may be examples of the corresponding devices described with reference to FIG. 1. In the example of FIG. 2A, the UEs 215 may each support sidelink communications using one or multiple cellular RATs (e.g., 4G systems, NR systems). The wireless communications system 200 may also include an AP 202, a STA 204-*a*, and a STA 204-*b*, which may be examples of the corresponding devices as described with reference to FIG. 1. In the example of FIG. 2, the AP 202 and the STAs 204 may each support wireless communications using Wi-Fi.

The UEs 215 may communicate within a coverage area 210 which may be an example of a geographic coverage area 110 described with reference to FIG. 1. In the example of FIG. 2, the UE 215-*a* and the UE 215-*b* may communicate using a communication link 220-*a* and the UE 215-*a* and the UE 215-*c* may communicate using a communication link 220-*b*. The communication links 220 may each be an example of a communication link 125 as described with reference to FIG. 1. In the example of FIG. 2, the communication links 220 may be an example of a sidelink as described herein (e.g., a sidelink of a cellular RAT, an NR sidelink). The wireless communications system 200 may include features for improved communications between the UEs 215, among other possible benefits.

In some examples, the wireless communications system 200 may support one or more sidelink enhancements, such as support of sidelink communications on an unlicensed radio frequency spectrum (e.g., an unlicensed spectrum). In some examples, such enhancements may exclude positioning and relaying. For example, the wireless communications system 200 may support both mode 1 and mode 2 sidelink communications, in which Uu operations (e.g., for mode 1) may be constrained to a licensed spectrum. As described herein, mode 1 sidelink communications may refer to sidelink communications in which resource allocations (e.g., for the sidelink communications) may be scheduled or configured through a network entity (e.g., a gNB). Additionally, or alternatively, as described herein, mode 2 sidelink communications may refer to sidelink communications in which resource allocations (e.g., for sidelink communications) may be determined through a sensing procedure conducted (e.g., autonomously) at the UEs 215 (e.g., a transmitting UE).

In some examples, the wireless communications system 200 may support a framework for sidelink operation on the unlicensed spectrum that may include a sidelink channel access mechanism for the unlicensed spectrum based on regional regulation constraints. The wireless communications system 200 may implement channel success schemes, such as may be used for NR unlicensed (NR-U) communications. Additionally, or alternatively, the framework may include a resource allocation mechanism, a sidelink physical channel structure (e.g., an NR sidelink physical channel structure), and one or more procedures to operate on the unlicensed spectrum. In some examples, radio frequency bands for the unlicensed spectrum (e.g., in frequency range one (FR1)) may include 5 GHz and 6 GHz bands, among other possible radio frequency bands.

In some examples, the wireless communications system 200 may support operation on the unlicensed spectrum to promote increased data rates. In some examples, an increased data rate for sidelink may provide one or more enhancements to applications, such as sensor information (e.g., video) sharing between vehicles with a relatively high degree of driving automation, and commercial use cases, among other possible use cases. Increased data rates may, in some examples, be achieved with support of sidelink carrier aggregation and sidelink communications using the unlicensed spectrum. Furthermore, by enhancing sidelink operations for multiple radio frequency bands (e.g., FR1 and frequency range 2 (FR2)), increased data rates may be supported (e.g., relatively more efficiently) on the multiple radio frequency bands (e.g., FR1 and FR2). While the support of additional carrier frequencies (e.g., of the multiple radio frequency bands) and increased bandwidths may increase data rates, one or more benefits may be provided from increasing availability of sidelink, such as for a relatively wider range of applications. More specifically, with support of the unlicensed spectrum (e.g., and an enhancement in FR2), sidelink may be implemented in commercial devices that may utilize an ISM band that may be constrained to ITS safety related applications.

Additionally, or alternatively, operation on the unlicensed spectrum may provide one or more enhancements to V2X deployments such as V2X deployment scenarios in which multiple types of devices (e.g., both LTE V2X and NR V2X devices) may use (e.g., coexist in) a same (e.g., common) frequency channel. In some examples, for the multiple (e.g., two different) type of devices (e.g., the LTE V2X devices and the NR V2X devices) to coexist while using a common carrier frequency, a mechanism to utilize resource allocations (e.g., relatively efficiently) for the multiple types of devices (e.g., the two types of RATs, LTE and NR), may be implemented (e.g., to avoid negatively impacting the operation of each RAT).

In some examples, for mode 2 sidelink communications, a UE may decode an SCI to determine resource reservation by other UEs. For example, the UE 215-*a* may transmit an SCI (e.g., including a resource set indication 225) to the UE 215-*b*. In some examples, an SCI that includes an indication of a quantity of resources reserved by a UE (e.g., the resource set indication 225) may be referred to as a reservation announcement. The UE 215-*b* may decode the SCI (e.g., the reservation announcement) and determine which resources (e.g., a set of resources) may be reserved at the UE 215-*a*. For decoded SCIs, a UE (e.g., the UE 215-*b*) may determine whether a resource is available by measuring a received power (e.g., a reference signals received power (RSRP)) during a sensing window. For example, during the sensing window, the UE 215-*b* may determine a set of available resources (e.g., a set of candidate resources, a candidate resource list) based on SCIs transmitted by other UEs. In some examples, if the received power of an SCI satisfies (e.g., is above, exceeds) a threshold, the UE 215-*b* may determine that resources associated with the SCI are not available (e.g., are reserved by another UE, are reserved at the UE that transmitted the SCI).

For example, the UE 215-*b* may determine that the set of resources reserved at the UE 215-*a* are not available by determining that a received power of the SCI transmitted from the UE 215-*a* (e.g., including the resources set indication 225) satisfies a threshold. Accordingly, resources associated with an SCI in which the received power fails to satisfy (e.g., is below, fails to exceed) the threshold may be considered available. In some examples, if a quantity of available resources is less than a percentage (e.g., about 20%) of the quantity of resources (e.g., included in a resource selection window), the threshold (e.g., an RSRP threshold) may be reduced (e.g., by about 3 decibels (dB) or an otherwise suitable quantity of dBs). In some examples, resources may be selected (e.g., from the set of candidate resources) at the UE 215-*b* for transmitting sidelink communications randomly (e.g., within a packet protocol data unit (PDU) constraint). In some examples, a length of the sensing window (e.g., for identifying candidate resources) may be configured (e.g., at the UE 215-*a*, or the UE 215-*b*, or both). Additionally, or alternatively, in some examples, an SCI (e.g., including the resource set indication 225) may indicate a priority of the reservation (e.g., of the reserved resources).

In some examples, a resource reservations (e.g., an SCI including the resource set indication 225) announced at the UE 215-*a* may be acknowledged (e.g., respected) by other sidelink devices that may decode an SCI reservation announcement (e.g., other NR sidelink devices, the UE 215-*b*). However, other communication devices operating on other RATs may not decode SCI reservation announcements. For example, the AP 202, the STA 204-*a*, and the STA 204-*b* may be using Wi-Fi (or another RAT different from the RAT used for wireless communications between the UE 215-*a* and the UE 215-*b*) and, as such, may not decode an SCI (e.g., a reservation announcement including the resource set indication 225) transmitted from the UE 215-*a* (or the UE 215-*b*). In such an example, the AP 202, the STA 204-*a*, and the STA 204-*b* may not be aware of reservations from the UE 215-*a* and, therefore, may not acknowledge (e.g., respect) resource reserved at the UE 215-*a*. That is, the AP 202, the STA 204-*a*, and the STA 204-*b* may transmit communications using the set of resources reserved at the UE 215-*a*. In such an example, the UE 215-*a* (e.g., the UE that has reserved a resource) may have a reduced likelihood of accessing (e.g., may not be guaranteed use of) the resource (e.g., due to the resource possibly being occupied by transmissions from the AP 202, the STA 204-*a*, or the STA 204-*b*). In some examples (e.g., for UEs that may experience increased interference from other RATs, increased inter-RAT interference), a reduced likelihood of accessing (e.g., not being guaranteed use of) reserved resources may lead to a lack of resources (e.g., resource starvation) for transmitting sidelink communications and an increased rate of (e.g., continuous) LBT failures. Therefore, an enhanced Mode 2 reservation framework for NR-U (e.g., to react to LBT failures) may provide one or more benefits to sidelink communications.

In some examples, a transmitting UE (e.g., the UE 215-*a*) may experience an LBT failure if a UE receiving an SCI transmitted from the UE 215-*a* (e.g., a receiving UE, the UE 215-*b*) fails to decode the SCI (e.g., an SCI1 or an SCI2) or if the UE 215-*b* performed an availability check and determined that the resource is occupied (or preempted). That is, an LBT failure may result if the UE 215-*b* fails to decode an SCI and the determines to transmit using the resource indicated using the SCI. In such an example, the UE 215-*a* (e.g., the transmitting UE, the UE that experienced the LBT failure) may wait (e.g., for one or more slots or one or more minislots) for another (e.g., a next) reservation (e.g., if any) to attempt a retransmission on another (e.g., already reserved) resource. In some examples, such retransmissions may be scheduled after a feedback occurrence (e.g., a physical sidelink feedback channel (PSFCH) occurrence) that may increase latency unnecessary. Additionally, or alternatively, the UE 215-*a* may restart (e.g., begin again) resource selection (e.g., attempt to use a different resource from a set of candidate resources). In such an example, the LBT failure may be an example of a resource availability check. For example, the UE 215-*a* may trigger resource reselection in the selection window, however the UE 215-*a* may not be guaranteed use of the reselected resource (e.g., may experience another LBT failure)

As an illustrative example, if the UE 215-*a* is not able to announce reservations (e.g., due to LBT failures), the UE 215-*a* may attempt another LBT procedure using another resource that may occur relatively later in a selection window, for example on another candidate resource selected at the UE 215-*a*. For example, if the UE 215-*a* experiences an LBT failure, the UE 215-*a* may attempt the transmission (e.g., an initial transmission and reservation of other resources) using use a resource reserved at the UE 215-*a* for retransmissions. Additionally, or alternatively, the UE 215-*a* may implement (e.g., invoke) resource reselection by attempting to use an available resource from the set of candidate resources (e.g., a candidate resource list). In some examples, however, if an LBT failure rate is relatively high, resource reselection may lead to multiple collisions and expiration of packet delay budget (PDB) associated with the transmissions. For example, transmissions delayed to subsequent resources (e.g., an end of the selection window) may approach the PDB and reduce opportunities for the UE 215-*a* to perform a HARQ retransmission. In some examples, resource reselection may occur according to a timeline. For example, the UE 215-*a* may wait (e.g., at least for a duration of a processing time) prior to implementing reselection, such that the UE 215-*a* may process and reselect the resource. As such, an increased quantity of uncoordinated reselection collisions may occur (e.g., between UEs performing sidelink unlicensed (SL-U) operations, between the UE 215-*a* and the UE 215-*b*). That is, resource reselection may not guarantee a reduced likelihood of LBT failures (e.g., after the resource reselection). Therefore, techniques which provide one or more enhancements to sidelink channel access for the unlicensed spectrum may be desirable.

In some examples, persistent resource access for sidelink, as described herein, may provide one or more enhancements to sidelink channel access for the unlicensed spectrum. For example, the UE 215-*a* may transmit a first sidelink signal (e.g., an SCI) including an indication (e.g., the resource set indication 225) of a set of resources that are reserved at the UE 215-*a* for sidelink communications. The UE 215-*a* may perform two or more LBT procedures 230 using respective consecutive slots (or minislots) of the set of resources. For example, the UE 215-*a* may perform a second LBT procedure (e.g., of the LBT procedures 230) based on a failure of a first LBT (e.g., of the LBT procedures 230). The UE 215-*a* may transmit a second sidelink signal (e.g., a sidelink signal 235) to the UE 215-*c* using a portion of the set of resources following two or more of the LBT procedures 230. The UE 215-*a* may release a remaining portion of the set of resources after transmitting the sidelink signal 235 (e.g., to be used by other sidelink devices, such as the UE 215-*b*). In some examples, overbooking resources, such that the UE 215-*a* may perform multiple LBT procedures using consecutive slots (or minislots), may increase the likelihood of the UE 215-*a* gaining access to the channel and increase the reliability of sidelink communications within the wireless communications system 200, among other possible benefits.

Additionally, or alternatively, the UE 215-*b* may receive (e.g., from the UE 215-*a*) the SCI including the resource set indication 225 indicating the set of resources that are reserved at the UE 215-*a* for sidelink communications. The UE 215-*b* may monitor the set of resources based on the resource set indication 225. The UE 215-*b* may detect a portion of available resources of the set of resources (e.g., the resources released at the UE 215-*a*) based on the monitoring. In some examples, the portion of available resources may be available for the UE 215-*b* to use for sidelink communications based on overbooking at the UE 215-*a*. For example, the portion of available resources may follow an end of the sidelink communications at the UE 215-*a* (e.g., an end of the sidelink signal 235). That is, the portion of available resources may be overbooked resources (e.g., persistent resources) released from the UE 215-*a* after the UE 215-*a* gained access to the channel (e.g., due to a successful LBT procedure) and transmitted the sidelink signal 235. In some examples, the UE 215-*b* may perform at least one LBT procedure using the portion of available resources (e.g., the release resources) based on the detecting. Therefore, releasing overbooked (e.g., and unused) resources may increase system capacity and resource utilization within the wireless communications system 200, among other possible benefits.

Figure 2B:
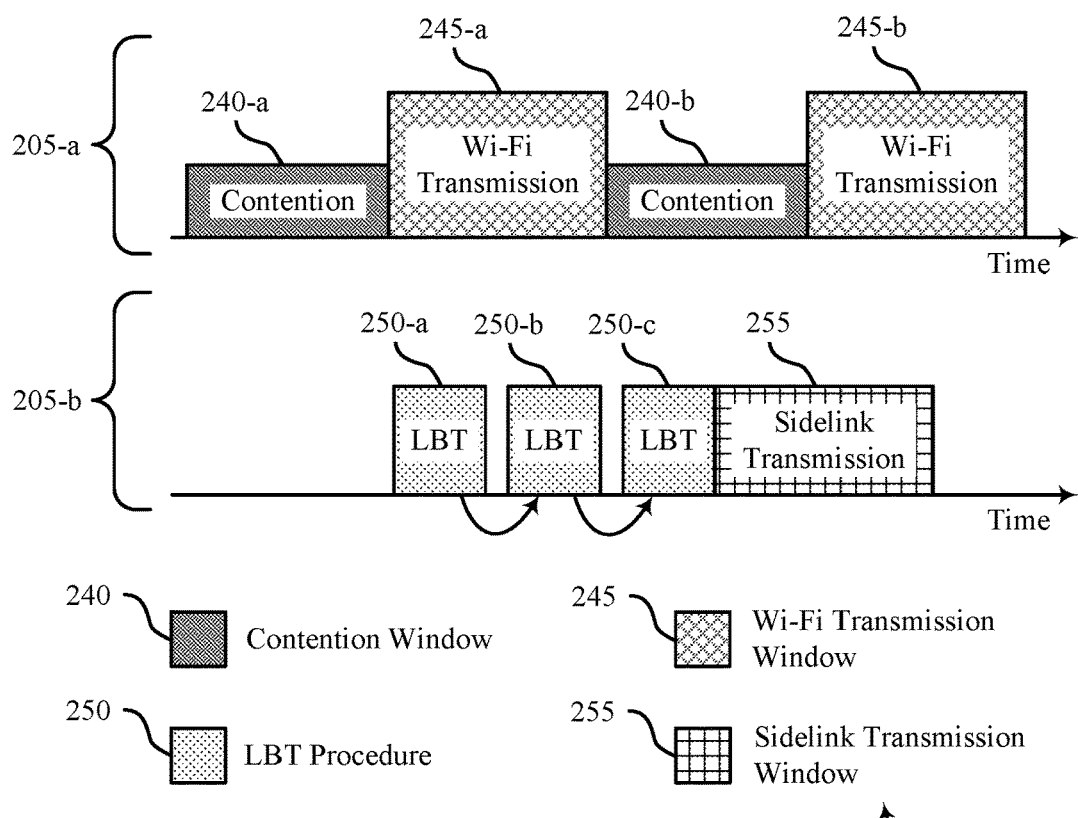
FIG. 2B illustrates an example of a timing diagram that supports persistent resource access for sidelink in accordance with one or more aspects of the present disclosure.

FIG. 2B illustrates an example of a timing diagram 201 that supports persistent resource access for sidelink in accordance with one or more aspects of the present disclosure. In some examples, timing diagram 201 may implement aspects of wireless communications system 100 and the wireless communications system 200. For example, the timing diagram 201 may be implemented at the UE 215-*a*, the UE 215-*b*, the AP 202, and one or both of the STAs 204 as described with reference to FIG. 2A.

Some RATs, such as Wi-Fi, may experience one or more unfair advantages over 3GPP 5G-NR or similar sidelink due to asynchronous access. For example, communication devices using a cellular RAT (e.g., the UE 215-*a*, the UE 215-*b*) may implement a reservation mechanism for resources of the unlicensed spectrum that includes performing a random (e.g., non-persistent) sampling of a channel. In such an example, the UE 215-*a* (or the UE 215-*b*, or both) may wait for relatively long (e.g., pro-longed) time prior to gaining access to the channel (e.g., prior to achieving a relatively favorable random outcome). For example, the UE 215-*a* may refrain from using (e.g., give-up) reserved resources upon failing to gain access to the channel (e.g., upon detecting an LBT failure). That is, upon determining that an LBT procedure failed, the UE 215-*a* may preform resource reselection for a subsequent resource in the resource selection window (e.g., may randomly select another candidate resource of the set of candidate resources).

Additionally, or alternatively, as illustrated in the example of FIG. 2B, a resource reservation mechanism for Wi-Fi (e.g., a resource reservation mechanism 205-*a*) may operate according to asynchronous access, such that Wi-Fi communications may not be interrupted (e.g., occasionally interrupted) for a relatively long time duration (e.g., relative to a time duration during which the UE 215-*a* may sample the channel). For example, in accordance with the resource reservation mechanism 205-*a*, the AP 202 may refrain from transmitting Wi-Fi communications during one or more contention windows 240 (e.g., a contention window 240-*a*, or a contention window 240-*b*, or both) and may transmit Wi-Fi communications during one or more Wi-Fi transmission windows 245 (e.g., a Wi-Fi transmission window 245-*a*, or a Wi-Fi transmission window 245-*b*, or both). As such, the AP 202 may transmit Wi-Fi communications relatively more frequently (e.g., relative to sidelink transmissions from the UE 215-*a*). For example, the AP 202 may refrain from increasing an adaptive backoff or may refrain from increasing (e.g., continuously increasing) a transmission control protocol contention window, which may provide the AP 202 an increased likelihood of gaining access to the channel (e.g., relative to the UE 215-*a*).

In some example, however, the UE 215-*a* may overbook resources, such that the UE 215-*a* may perform multiple LBT procedures using multiple (e.g., consecutive) resources. That is, the UE 215-*a* may add persistence (e.g., to a resource reservation mechanism used at the UE 215-*a*), for example if the UE 215-*a* experiences relatively high intra-RAT interference. For example, the UE 215-*a* may perform a resource reservation mechanism 205-*b*, such that the UE 215-*a* may continue sensing the channel, for example until the UE 215-*a* determines one or more resources are available or until a quantity of reserved resources are used (e.g., until a configured adaptive window expires). That is, the UE 215-*a* may perform multiple LBT procedures (e.g., may persist) on reserved resource until an LBT procedure performed at the UE 215-*a* is successful (e.g., and the UE 215-*a* gains access to the channel). For example, as illustrated in the example of FIG. 2B, the UE 215-*a* may perform an LBT procedure 250-*a* and an LBT procedure 250-*b* using respective resources that overlap (e.g., in the time-domain) with the Wi-Fi transmission window 245-*a*. As such, the LBT procedure 250-*a* and the LBT procedure 250-*b* may fail (e.g., due to the resources being occupied with Wi-Fi transmissions from the AP 202). In such an example, however, the UE 215-*a* may perform an LBT procedure 250-*c* using a resource that overlaps (e.g., in the time domain) with the contention window 240-*b*. In such an example, the LBT procedure 250-*c* may be successful and the UE 215-*a* may gain access to the channel. As such, the UE 215-*a* may transmit sidelink communications during a sidelink transmission window 255. Therefore, in some examples, persistent resource access for sidelink, as described herein, may provide one or more enhancements to sidelink communications (e.g., exclude positioning and relaying) for the unlicensed spectrum.

Figure 3A:
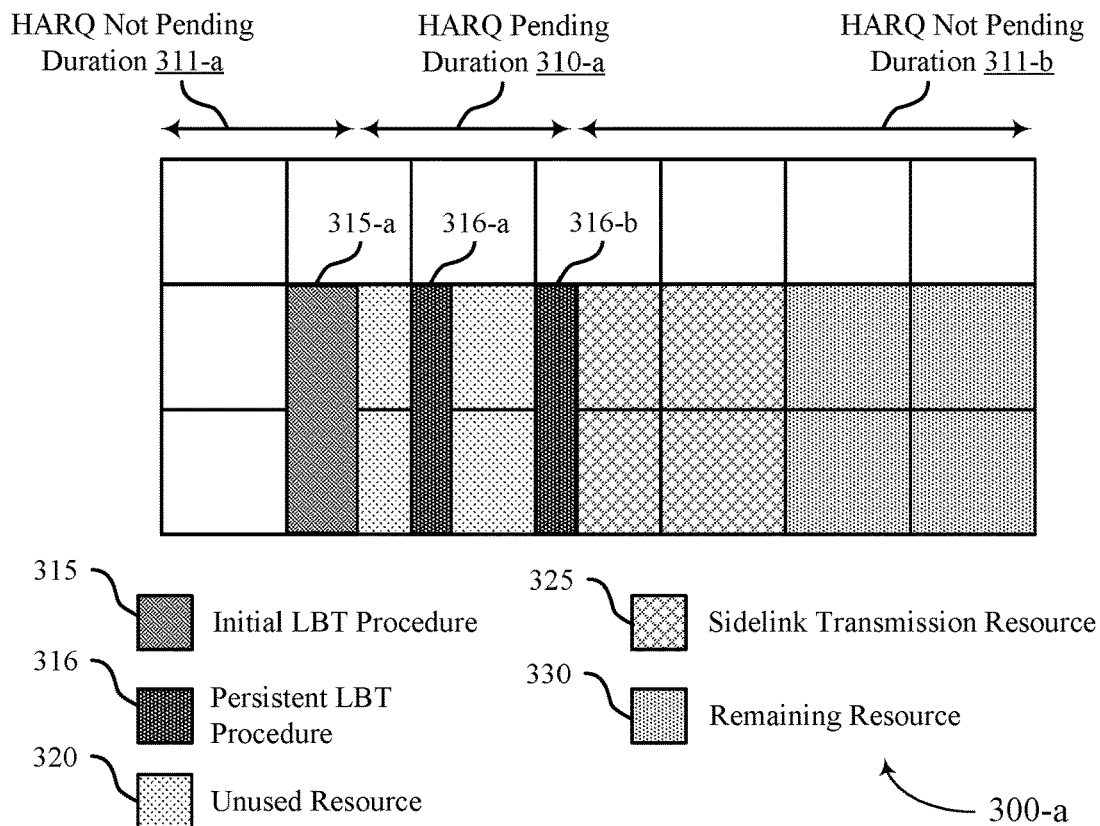
FIGS. 3A and 3B each illustrate an example of a channel access scheme that supports persistent resource access for sidelink in accordance with one or more aspects of the present disclosure.
Figure 3B:
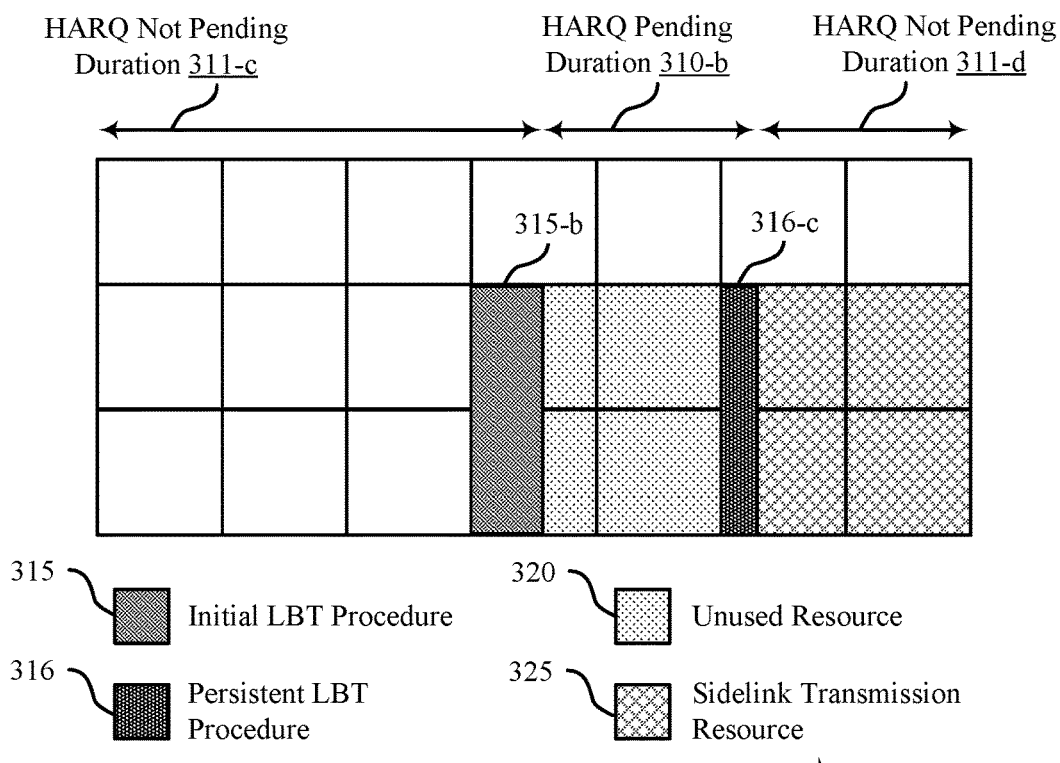

FIGS. 3A and 3B each illustrate an example of a channel access scheme 300 (e.g., a channel access scheme 300-*a* and a channel access scheme 300-*b*, respectively) that supports persistent resource access for sidelink in accordance with one or more aspects of the present disclosure. In some examples, the channel access schemes 300 may implement or be implemented at or using one or more aspects of the wireless communications system 100 and the wireless communications system 200. For example, the channel access schemes 300 may be implemented at one or more UEs, which may be examples of the corresponding devices as described with reference to FIGS. 1, 2A, and 2B.

In some examples, a UE may be configured to reserve (e.g., overbook) one or more resources (e.g., persistent resource), such that the UE may perform (e.g., attempt) multiple LBT procedures and begin transmitting sidelink communications upon determining that an LBT procedure is successful (e.g., a first LBT success), such as within an overbooked resource (e.g., a persistent resource). For example, the UE (e.g., a transmitting UE) may perform (e.g., attempt) an LBT procedure at each transmission opportunity until an LBT procedure performed at the UE is successful (or an end of the overbooked (e.g., persistent resources) occurs. That is, for a UE with one or more persistent resources (e.g., for a UE that has reserved persistent resources), the UE may refrain from declaring an LBT failure and forgoing the reserved resource (e.g., due to the declared LBT failure). As such, the UE may increase resource utilization (e.g., may reduce unused resources, may reduce wasted resources) within the wireless communications system. In some examples, the UE may perform an LBT procedure at a slot (or minislot) boundary or relatively earlier in the slot (or minislot). Additionally, or alternatively, in some examples, the channel access schemes 300 may not depend on a category of the LBT procedure (e.g., whether the LBT procedure is CAT1, CAT2, CAT3, or CAT4).

As illustrated in the example of FIG. 3A, a first UE may perform channel access procedures (e.g., LBT procedures) in accordance with the channel access scheme 300-*a*. For example, the first UE may perform an initial LBT procedure 315-*a* that may fail and, as such, resources during which the initial LBT procedure 315-*a* was performed may be unused (e.g., may be unused resources 320). In some examples, due the initial LBT procedure 315-*a* failing, the first UE may perform a persistent LBT procedure 316-*a* (e.g., using an overbooked resource, using a persistent resources). In some examples, the persistent LBT procedure 316-*a* may fail. In such examples, the first UE may perform another persistent LBT procedure (e.g., a persistent LBT procedure 316-*b*). In such an example, the persistent LBT procedure 316-*b* may be successful and the first UE may transmit sidelink communications using sidelink transmission resources 325. In some examples (e.g., in response to transmitting the sidelink communications), the first UE may release remaining resources (e.g., released resources 330) that may have been overbooked at the first UE. That is, once a sidelink transmission from the first UE terminates (e.g., once the first UE completes transmission of the sidelink communications using the sidelink transmission resources 325) the first UE may refrain from using (e.g., skip, vacate) remaining resources overbooked at the first UE (e.g., may release remaining scheduled resources). In some examples, a quantity of resources overbooked at the first UE may be based on a persistence ratio (e.g., a persistence factor) between a TDRA corresponding to an entirety of a set of resources reserved (e.g., scheduled) for the first UE and a TDRA corresponding to a sidelink signal to be transmitted from the first UE (e.g., a ratio between a reserved transmission duration and an intended transmission duration). As an illustrative example, if a sidelink signal to be transmitted from the first UE occurs during a transmission duration of 2 slots (e.g., if the sidelink transmission resources 325 includes 2 slots), the first UE may reserve (e.g., overbook) a transmission duration of 6 slots (e.g., may reserve resources in accordance with a persistence ratio of 3).

Additionally, or alternatively, as illustrated in the example of FIG. 3B, a second UE may perform channel access procedures (e.g., LBT procedures) in accordance with the channel access scheme 300-*b*. For example, the second UE may perform an initial LBT procedure 315-*b* that may fail, for example due to the first UE occupying the channel (e.g., winning contention of the resources) during the time instance in which initial LBT procedure 315-*b* may be performed at the second UE. As such, the resources during which the initial LBT procedure 315-*b* was performed may be unused at the second UE (e.g., may include unused resources 320). In some examples, due the initial LBT procedure 315-*b* failing, the second UE may perform a persistent LBT procedure 316-*c*. In some examples, the second UE may perform the persistent LBT procedure 316-*c* during resources overbooked (e.g., and released) at the first UE. As such, the persistent LBT procedure 316-*c* may be successful. In such an example (e.g., in response to the persistent LBT procedure 316-*c* being successful), the second UE may transmit sidelink communications using sidelink transmission resources 325.

In some examples, a UE (e.g., the first UE or the second UE) may begin an LBT procedure according to a HARQ state (e.g., whether a HARQ state of the sidelink signal to be transmitted is pending). For example, after an LBT failure, a HARQ state of the sidelink signal to be transmitted (e.g., from the UE) may be set to pending, such as to facilitate retransmissions (e.g., autonomous retransmissions) using consecutive slots (or minislots) using the NR-U mechanism (e.g., the channel access schemes 300). For example, a backoff duration during an LBT may be a function of the HARQ state of the sidelink signal (e.g., transport block (TB)) to be transmitted. That is, unlicensed autonomous transmission from a MAC layer of the UE may be coupled with prioritized channel access.

As illustrated in the example of FIG. 3A, during a HARQ not pending duration 311-*a*, a HARQ state of a sidelink signal (e.g., TB) to be transmitted from the first UE may not be pending and, as such, the first UE may perform the initial LBT procedure 315-*a*. In some examples, in response to the initial LBT procedure 315-*a* failing, the first UE may set the HARQ status of the sidelink signal to be transmitted to pending. As such, during a HARQ pending duration 310-*a*, the first UE may perform the persistent LBT procedure 316-*a*. In some examples, if the persistent LBT procedure 316-*a* fails, the HARQ status of the sidelink signal may remain at pending and the first UE may determine to perform the persistent LBT procedure 316-*b*. The persistent LBT procedure 316-*b* may be successful and, as such, the first UE may transmit the sidelink signal (e.g., in which the HARQ status is pending). In such an example, the first UE may determine to release the released resources 330 (e.g., during a HARQ not pending duration 311-*b*). In some examples, performing a persistent LBT procedure (e.g., the persistent LBT procedure 316-*a*, or the persistent LBT procedure 316-*b*, or both) during the HARQ pending duration 310-*a* may provide relatively early access to the corresponding resources (e.g., the resources that occur during the HARQ pending duration 310-*a*) and, as such, may provide prioritized access to the resources (e.g., relative to other UEs that may not have sidelink signals with a HARQ pending status).

For example, as illustrated in the example of FIG. 3B, during a HARQ not pending duration 311-*c*, a HARQ status of a signal to be transmitted from the second UE may not be pending and, as such, the second UE may perform the initial LBT procedure 315-*b*. In such an example, because the first UE may perform the persistent LBT procedure 316-*b* during a same resource (e.g., and at a relatively early time instance of the same resource) as the second UE may perform the initial LBT procedure 315-*b*, the first UE may gain access to the channel and the initial LBT procedure 315-*b* (e.g., performed at the second UE) may fail. That is, if the sidelink signal to be transmitted from the second UE has a HARQ not pending status and the resource during which the LBT procedure is performed is reserved by another UE (e.g., the first UE) the initial LBT procedure 315-*b*, that may include an LBT duration that may be relatively long (e.g., and possibly random) relative to the persistent LBT procedure 316-*b* performed at the first UE. For example, a duration of the initial LBT procedure 315-*b* may be chosen at the second UE, such as to prioritize HARQ-pending transmissions (e.g., the HARQ pending transmission of the first UE). That is, LBT procedures may be chosen at the first UE and the second UE, such that the UE with a HARQ-pending transmission may have an increased likelihood of gaining access to the channel relative to the UE without a HARQ-pending transmission (e.g., may gain access to the medium prior to UEs without HARQ-pending transmissions).

In some examples, in response to the initial LBT procedure 315-*b* failing, the second UE may set the HARQ status of the sidelink signal to be transmitted to pending. As such, during a HARQ pending duration 310-*b*, the second UE may perform the persistent LBT procedure 316-*c*. In some examples, the persistent LBT procedure 316-*c* may be successful and, as such, the second UE may transmit the sidelink signal (e.g., in which the HARQ status is pending) using the sidelink transmission resources 325 (e.g., during a HARQ not pending duration 311-*d*).

In some examples, prioritization of HARQ-pending transmissions may be achieved through choosing an LBT procedure that begins relatively earlier in a resource (e.g., a slot or a minislot of a resource) compared to other LBT procedures. Additionally, or alternatively, prioritization of HARQ-pending transmissions may be achieved through controlling (e.g., modifying, adjusting) a contention window size of an LBT procedure according to the HARQ state of the sidelink signal to be transmitted. In some examples, if a HARQ state of a signal to be transmitted by a UE is not pending and the resource (e.g., during which the LBT procedure may be performed) is not reserved by another UE, the UE may choose an LBT procedure that neither increases nor decreases the likelihood of the UE gaining access to the channel (e.g., the UE may choose an LBT procedure that neither prioritizes nor deprioritizes the signal to be transmitted from the UE). In some examples, choosing an LBT procedure based on a HARQ status of a transmission (e.g., using tiered LBT procedures), may increase the reliability of sidelink communications within a wireless communications system, among other possible benefits.

Figure 4:
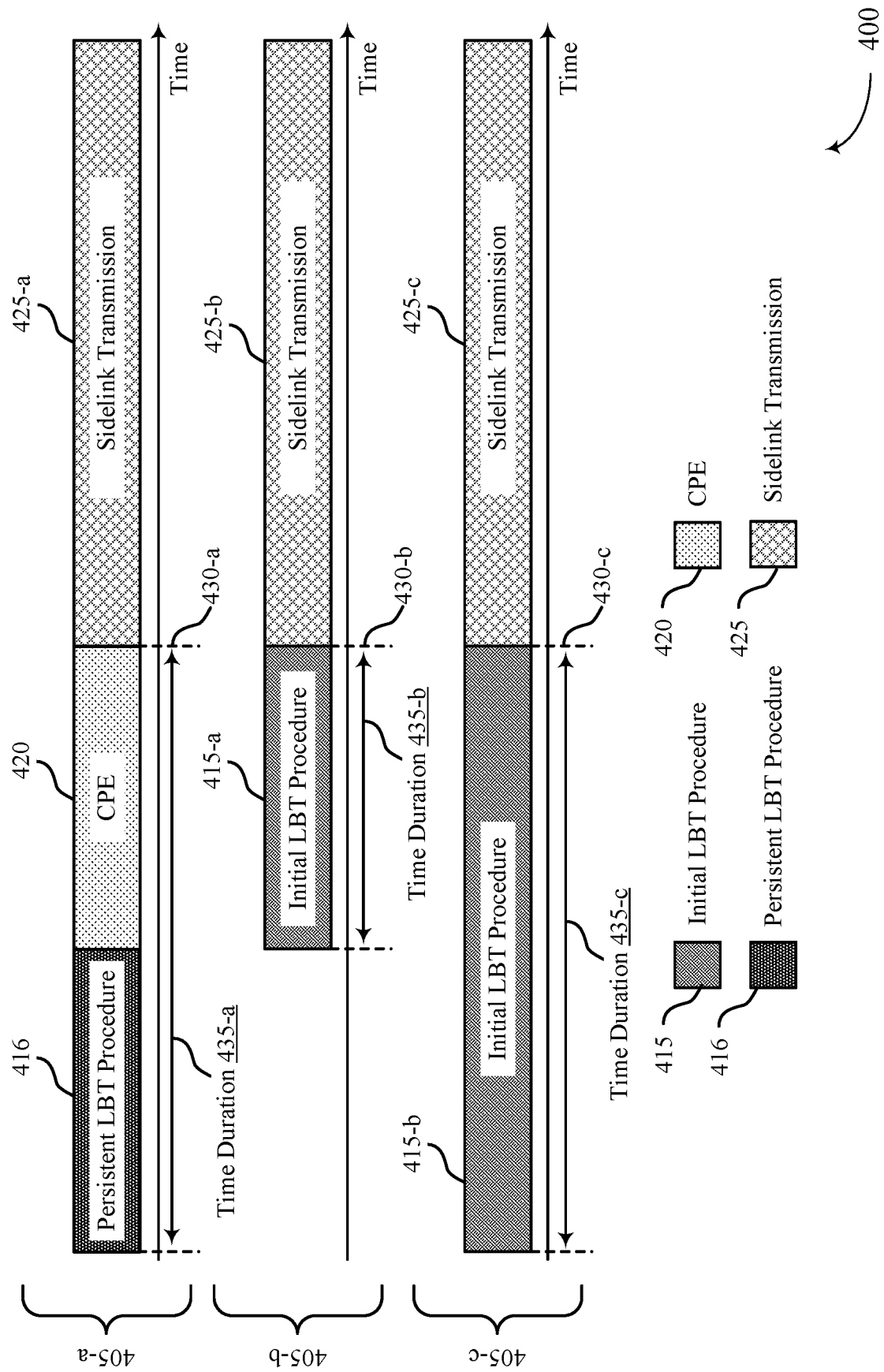
FIG. 4 illustrates an example of a channel access procedure that supports persistent resource access for sidelink in accordance with one or more aspects of the present disclosure.

FIG. 4 illustrates an example of a channel access procedure 400 that supports persistent resource access for sidelink in accordance with one or more aspects of the present disclosure. In some examples, the channel access procedure 400 may implement or be implemented at or using one or more aspects of the wireless communications system 100 and the wireless communications system 200. For example, the channel access procedure 400 may be implemented at one or more UEs, which may be examples of the corresponding devices as described with reference to FIGS. 1, 2A, 2B, 3A, and 3B.

In some examples, to increase resource utilization of overbooked resources (e.g., persistent resources), a UE may be configured to release unused (e.g., overbooked) resources, such that the overbooked resources may be reused (e.g., by other UEs). For example, resources overbooked at the UE (e.g., persistent resources) may enable other UEs to access the channel if the UE successfully performed a transmission prior to using the overbooked resources. That is, overbooking resources at a UE may not prevent (e.g., block, prohibit) other UEs from reusing the overbooked resources if the overbooked resources are not used at the UE (e.g., the UE that overbooked the resources). For example, one or more UEs may be configured, such that LBT procedures performed by multiple UEs using an overbooked resource may prioritize (e.g., favor) the UE that overbooked the resource (e.g., the resource owner). That is, a UE that overbooks a resource may have an increased likelihood of gaining access to the channel (e.g., using the resource) relative to other UEs that may contend for access to the resource. In some examples, such prioritization may be achieved through tiered LBT contention that may increase the likelihood (e.g., deterministically or with a relatively high probability) that the UE that overbooked the resource will gain access to the channel for use of the resource (e.g., will win contention of the resource).

As illustrated in the example of FIG. 4, a first UE (e.g., a UE that reserved a resource, a resource owner) may begin an LBT procedure (e.g., to transmit using the resource) relatively earlier in a slot (e.g., for persistent access). For example, the first UE may perform channel access in accordance with a configuration 405-*a*, in which the first UE may begin a persistent LBT procedure 416 at a time instance that may be a time duration 435-*a* prior to a slot boundary 430-*a* (e.g., a slot boundary or a minislot boundary). Additionally, or alternatively, a second UE (e.g., a UE that did not reserve the resource) may perform channel access in accordance with a configuration 405-*b*. For example, the second UE may begin an initial LBT procedure 415-*a* at a time instance that may be a time duration 435-*b* prior to a slot boundary 430-*b* (e.g., a slot boundary or a minislot boundary). That is, the first UE may perform the persistent LBT procedure 416 at a time instance prior to the slot boundary 430-*a*, such that the time duration 435-*a* is relatively longer than the time duration 435-*b* (e.g., the time duration prior to which the second UE may begin the initial LBT procedure 415-*a*). In some examples, for initial access, the second UE may begin the initial LBT procedure 415-*a* at (or prior to) the slot (or minislot) start, such that a sidelink transmission 425-*b* may occur (e.g., if the initial LBT procedure 415-*a* is successful) at the slot (or minislot) beginning (e.g., at the slot boundary 430-*b*). In such an example, if the persistent LBT procedure 416 is successful, the first UE may transmit a cyclic prefix extension (CPE), such as a CPE 420, such that the channel may be occupied until the slot boundary 430-*a*, at which the first UE may perform a sidelink transmission 425-*a*.

Additionally, or alternatively, the second UE may perform channel access in accordance with a configuration 405-*c*. For example, to increase the likelihood that the first UE (e.g., the resource owner) may gain access to the channel (e.g., deterministically or with a relatively high probability), the UEs may be configured to perform channel access such that a back-off duration of the persistent LBT procedure 416 (e.g., performed at the resource owner) may be relatively shorter than a backoff duration of an initial LBT procedure 415-*b* (e.g., performed at another UE attempting to access an overbooked resource). For example, (e.g., for persistent access), a size of a contention window of the persistent LBT procedure 416 may be chosen, such that (e.g., to ensure) the size of the contention window of the persistent LBT procedure 416 is relatively smaller than a size of a contention window of the initial LBT procedure 415-*b*. In some examples, the size of the contention window for the persistent LBT procedure 416 may have a range (e.g., from about zero to a minimum contention window size or an otherwise suitable contention window size) that may be relatively smaller than a range of the initial LBT procedure 415-*b* (or the initial LBT procedure 415-*a*).

In some examples (e.g., for initial access), a UE may perform an initial LBT procedure (e.g., the initial LBT procedure 415-*b*) and may adjust the contention window size of the initial LBT procedure 415-*b* based on a HARQ state (e.g., and priority class) of the sidelink signal to be transmitted from the UE, such that a duration of the initial LBT procedure 415-*b* may be relatively long compared to a duration during which the persistent LBT procedure 416 may occur (e.g., the size of the contention window for the initial LBT procedure 415-*b* may range from about zero to a maximum contention window size or an otherwise suitable contention window size). In some other examples (e.g., for initial access using a persistent resource reserved by another UE), the UE may adjust the contention window size of the initial LBT procedure 415-*b* such that the initial LBT procedure 415-*b* may occur during a duration that may be relatively long compared to a duration during which the persistent LBT procedure 416 occurs (e.g., the size of the contention window for the initial LBT procedure 415-*b* may range from a minimum contention window size to a maximum contention window size or an otherwise suitable contention window size). In some examples, the second UE may begin the initial LBT procedure 415-*b* at a time instance that may be the time duration 435-*c* prior to a slot boundary 430-*c* (e.g., a slot boundary or a minislot boundary), at which (e.g., if the initial LBT procedure 415-*b* is successful) the second UE may perform a sidelink transmission 425-*c*.

Figure 5A:
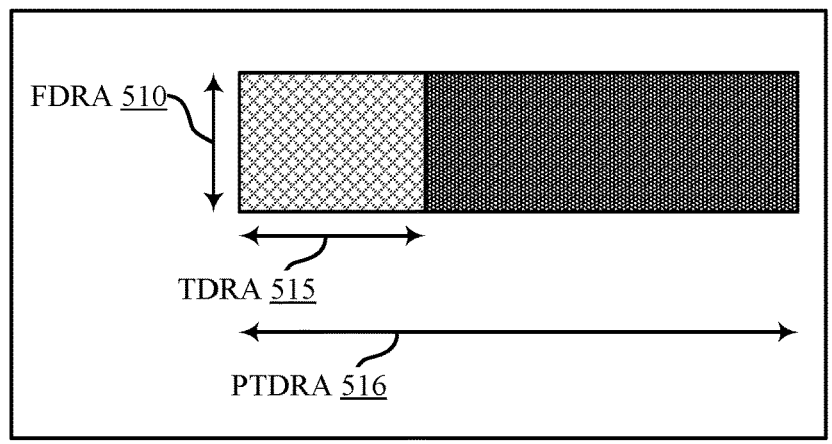
FIG. 5A illustrates an example of a resource allocation diagram that supports persistent resource access for sidelink in accordance with one or more aspects of the present disclosure.
Figure 5A:
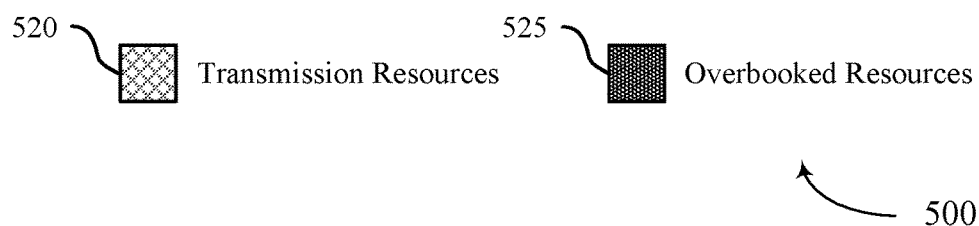

FIG. 5A illustrates an example of a resource allocation diagram 500 that supports persistent resource access for sidelink in accordance with one or more aspects of the present disclosure. In some examples, the resource allocation diagram 500 may implement or be implemented at or using one or more aspects of the wireless communications system 100 and the wireless communications system 200. For example, the resource allocation diagram 500 may be implemented at one or more UEs, which may be examples of the corresponding devices as described with reference to FIGS. 1, 2A, 2B, 3A, 3B, and 4.

In some examples, a UE may be configured with a framework for overbooking resources of the unlicensed spectrum to transmit sidelink communications. For example, the UE may reserve an increased amount of resources (e.g., time-domain resources) than may be used at the UE for transmitting sidelink communications (e.g., may overbook resources), such that the UE may perform multiple LBT procedures using consecutive resources (e.g., consecutive slots or consecutive minislots) reserved at the UE. For example, the UE may intend to transmit a sidelink signal with a frequency domain resource allocation (FDRA), such as an FDRA 510, and a TDRA 515. In such an example, the UE may overbook resources, such that an entirety of the resources reserved at the UE (e.g., including transmission resources 520 and overbooked resources 525) may correspond to a PTDRA 516. In some examples, the UE may overbook resources according to a persistence ratio. Additionally, or alternatively, the UE may indicate a quantity of overbooked resources (e.g., or persistence ratio) to other UEs, such that the other UEs may reuse overbooked resources that may be released at the UE, for example due to the UE successfully performing an LBT procedure and transmitting the sidelink signal prior to an end of the PTDRA 516.

Figure 5B:
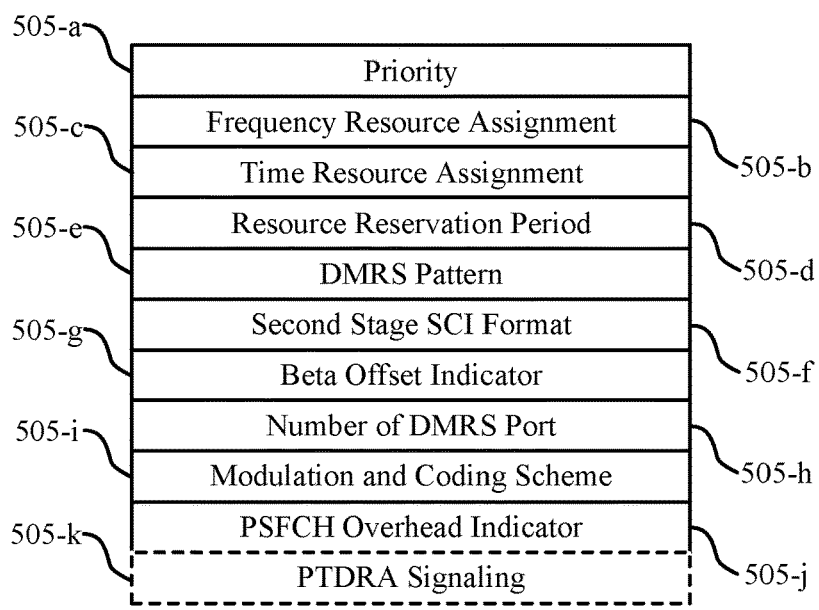
FIG. 5B illustrates an example of a control information format that supports persistent resource access for sidelink in accordance with one or more aspects of the present disclosure.

FIG. 5B illustrates an example of a control information format 501 that supports persistent resource access for sidelink in accordance with one or more aspects of the present disclosure. In some examples, the control information format 501 may implement or be implemented at or using one or more aspects of the wireless communications system 100 and the wireless communications system 200. For example, the control information format 501 may be implemented at one or more UEs, which may be examples of the corresponding devices as described with reference to FIGS. 1, 2A, 2B, 3A, 3B, 4, and 5A.

In some examples, a UE may indicate a quantity of overbooked resources (e.g., persistent resources) via an overbooking indication. In some examples, an overbooking indication (e.g., signaling of an overbooking indication) of a persistent reservation (e.g., a quantity of resources overbooked at the UE) may be communicated using SCI (e.g., an SCI 1). For example, a quantity of resources overbooked at the UE may be communicated using (e.g., though adding) a persistence indication field to an SCI. In some examples, the overbooking indication may indicate a persistence ratio (e.g., a persistence factor) between a PTDRA corresponding to an entirety of a set of resources reserved at the UE and a TDRA corresponding to a sidelink signal to be transmitted from the UE (e.g., a ratio of a reserved transmission duration and an intended transmission duration). For example, the UE may transmit an SCI as illustrated by the example of FIG. 5A. In such an example, the SCI may include multiple fields, such as a priority field 505-*a*, a frequency resource assignment field 505-*b*, a time resource assignment field 505-*c*, a resource reservation period field 505-*d*, a demodulation reference signal (DMRS) pattern field (e.g., a DMRS pattern field 505-*e*), a second state SCI format field 505-*f*, a beta offset indicator field 505-*g*, a number of DMRS port field 505-*h*, a modulation and coding scheme field 505-*i*, and a PSFCH overhead indicator field 505-*j*. It is to be understood that the names of fields described herein may change based on implementation of one or multiple devices (e.g., the UEs), and the examples described herein should not be considered limiting to the scope covered by the claims or the disclosure.

In some examples, the time resource assignment field may indicate the TDRA corresponding to a sidelink signal to be transmitted from the UE. In such an example, the SCI may also include a PTDRA signaling field 505-*k* that may indicate the persistence ratio (e.g., the ratio between the TRDRA and the PTDRA). For example, if the sidelink signal to be transmitted from the UE is to occur during a transmission duration of about 2 slots (e.g., about 2 minislots) and the UE determines to reserve (e.g., overbook) a transmission duration of about 6 slots (e.g., about 6 minislots), the UE may indicate a persistence ratio of about 3. In such an example, the UE may use the time resource assignment field 505-*c* to indicate a TDRA of about 2 and may use the PTDRA signaling field 505-*k* to indicate a persistence ratio of about 3 (e.g., indicating that the UE reserved a quantity of resources equal to about 3 times the quantity of resources indicated using the time resource assignment field 505-*c*).

Additionally, or alternatively, the overbooking indication may indicate the PTDRA and the TDRA to inform other UEs which resources the other UEs may attempt initial (e.g., deprioritized) LBT procedures. For example, if the sidelink signal to be transmitted from the UE is to occur during a transmission duration of about 2 slots (e.g., about 2 minislots) and the UE determines to reserve (e.g., overbook) a transmission duration of about 6 slots (e.g., about 6 minislots), the UE may indicate a PTDRA of about 6. In such an example, the UE may use the time resource assignment field 505-*c* to indicate a TDRA of about 2 and may use the PTDRA signaling field 505-*k* to indicate the PRDRA of about 6. In some examples, the UE may refrain from transmitting an overbooking indication (e.g., an overbooking indication may not be signaled from the UE using the SCI). In such an example, the other UEs may not be capable of distinguishing between resources reserved by a UE for transmitting a sidelink signal and overbooked resources (e.g., reserved from the UE for performing multiple LBT procedures, for performing persistent LBT procedures). That is, the other UEs may not be capable of determine which resources the UE (e.g., the resource owner) may release (e.g., vacate), such that the other UEs may attempt to access the resources (e.g., with a relatively lower tier LBT in any part of the resource). In such an example, if the sidelink signal to be transmitted from the UE is to occur during a transmission duration of about 2 slots (e.g., about 2 mini-slots) and the UE determines to reserve (e.g., overbook) a transmission duration of about 6 slots (e.g., about 6 mini-slots), the UE may use the time resource assignment field to indicate a TDRA of about 6. In some examples, indicating an overbooking indication to other UEs may increase resource utilization within a wireless communications system, among other possible benefits.

Figure 6:
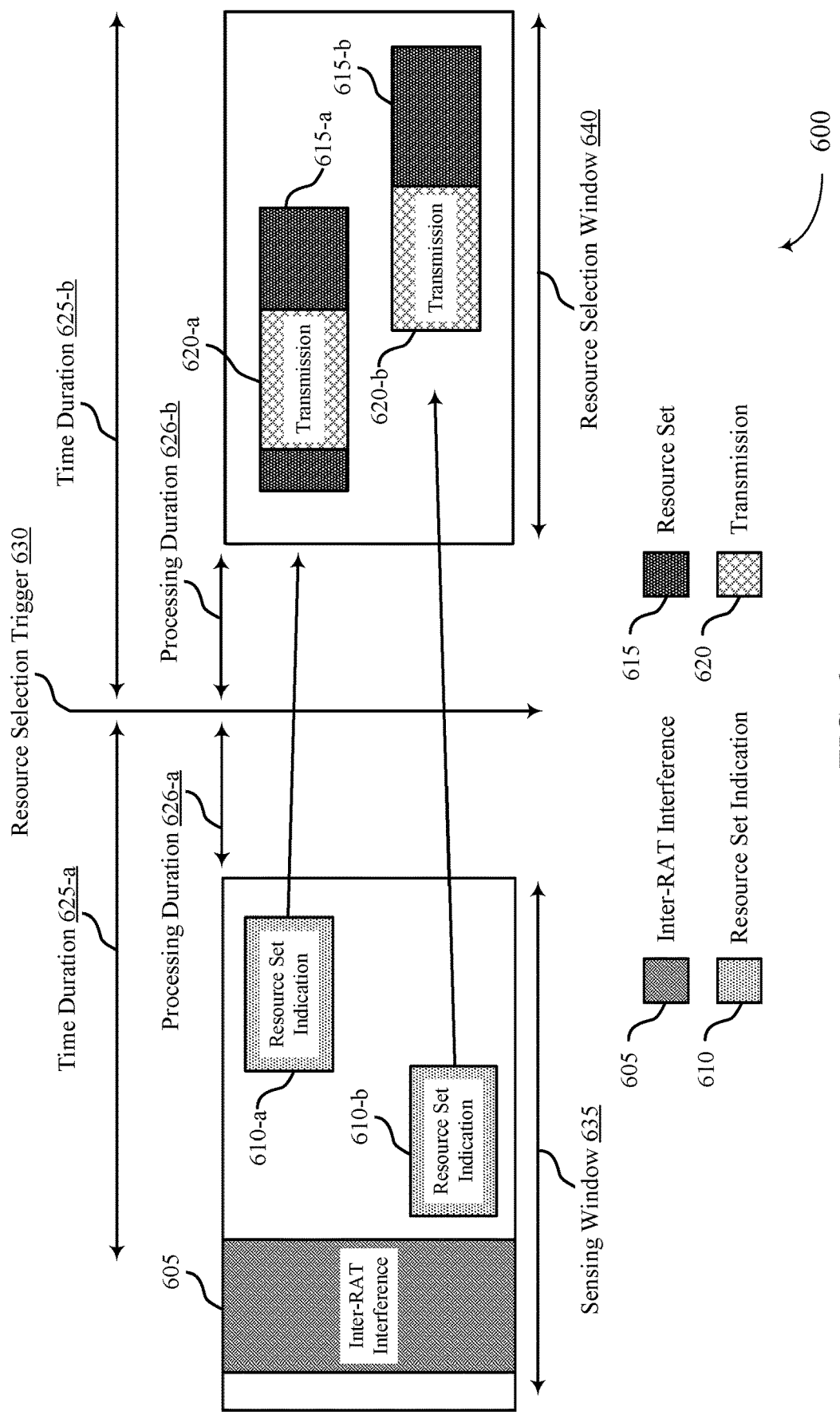
FIG. 6 illustrates an example of a resource reservation scheme that supports persistent resource access for sidelink in accordance with one or more aspects of the present disclosure.

FIG. 6 illustrates an example of a channel access scheme 600 that supports persistent resource access for sidelink in accordance with one or more aspects of the present disclosure. In some examples, the channel access scheme 600 may implement or be implemented at or using one or more aspects of the wireless communications system 100 and the wireless communications system 200. For example, the channel access scheme 600 may be implemented at one or more UEs, which may be examples of the corresponding devices as described with reference to FIGS. 1, 2A, 2B, 3A, 3B, 4, 5A, and 5B.

In some examples, a wireless communications system may support sidelink communications (e.g., using one or more cellular RATs) using an unlicensed radio frequency spectrum band (e.g., an unlicensed spectrum) that may be shared with one or more other RATs, such as Wi-Fi, or Bluetooth, or both, among other examples. In such examples, prior to transmitting sidelink communications using the unlicensed spectrum, a sidelink device (e.g., a UE) may perform a channel sensing procedure (e.g., during a sensing window 635) to identify a quantity of resources (e.g., of the unlicensed spectrum) that may be available for transmitting sidelink communications.

For example, the UE may perform channel sensing and resource reselection may according to a timeline. As illustrated in the example of FIG. 6, the UE may be configured to perform a channel sensing procedure during the sensing window 635, which may occur within a time duration 625-$a$ prior to a resource selection trigger 630 and a resource selection procedure during a resource selection window 640 within a time duration 625-$b$. The time duration 625-$a$ and the time duration 625-$b$ may be based on a PDB of a sidelink signal (e.g., TB) to be transmitted from the UE. In some examples, time duration 625 may be configured for the UE (e.g., with a value of about 100 ms, or about 1100 ms, or some otherwise suitable value). Additionally, or alternatively, the time duration 625-$b$ may be configured for the UE, for example, based on a priority (e.g., a traffic priority). In some examples, the time duration 625-$b$ may be determine based on a priority in accordance with Equation 1:

$$\{1,5,10,20\} \cdot 2^\mu, \mu=0,1,2,3 \quad (1)$$

where the value of $\mu$ may correspond to a subcarrier spacing configured for the UE (e.g., $\mu=0,1,2,3$ for a subcarrier spacing of 15 kHz, 30 kHz, 60 kHz, and 120 kHz, respectively). In some example, the UE may confirm available of a resource (e.g., perform an availability check) prior to transmitting during the resource (e.g., and subsequent to the resource selection trigger 630. In some examples, the UE may be configured with a processing duration 626-$a$ (e.g., a processing time) and a processing duration 626-$b$ during which the UE may perform processing (e.g., an selection of one or more resources).

In some examples, during the sensing window 635, the UE may monitor for SCI that may include resource set indications 610 (e.g., a resource set indication 610-$a$ or a resource set indication 610-$b$). That is, during the sensing window 635, the UE may use SCI transmitted from other UEs to identify a set of candidate resources from a resource pool (e.g., configured for the UE) For example, the resource set indication 610-$a$ may indicate a resource set 615-$a$ and the resource set indication 610-$b$ may indicate a resource set 615-$b$. In some examples, if the UE experiences increased interference from another communication device operating using a RAT different from the RAT used at the UE (e.g., if inter-RAT interference 605 is relatively high), the UE may not be capable of decoding SCIs transmitted from other sidelink devices (e.g., other UEs). In such examples, the UE may determine that no SCI are transmitted using the resources during which the UE detects the relatively high inter-RAT interference 605. In such an example, however, other UEs (e.g., that may not be affected from the relatively high inter-RAT interference impacting the UE) may have reserved some of the resources. As such, if the UE selects such resources, sidelink communications transmitted from the UE and the other UEs may collide.

Additionally, or alternatively, the UE may exclude resources that may have been reserved during an LBT period (e.g., the UE may exclude resources in a similar manner as the UE may excludes reserved resources based on a half-duplex constraint used at the UE while the UE may be transmitting sidelink communications). That is, if the UE monitors a quantity of resources during the sensing window and detects relatively high inter-RAT interference 605 for the quantity of resources, the UE may exclude the quantity of resources, such as if the quantity of resources (e.g., slots, minislots) were not monitored. In such an example, the UE may not restart the sensing window 635. For example, if the UE restarted the sensing window 635 in response to interruptions (e.g., continuous interruptions, such as from inter-RAT interference 605) the UE may not be capable of transmitting sidelink communications (e.g., during a resource selection window 640).

In some examples (e.g., rather than restarting the sensing window), the UE may exclude a resource (e.g., single-slot resource that may be represented as $R_{x,y}$) from the set of candidate resources (e.g., S) if the resource satisfies one or more conditions. For example, the UE may exclude a resource ($R_{x,y}$) of the resource pool from the set of candidate resources if the UE has not monitored the slot ($t'_m{}^{SL}$) associated with the resource. Additionally, or alternatively, the UE may exclude a resource ($R_{x,y}$) from the set of candidate resources (e.g., a condition would be met) if the UE is configured with a periodicity value and an SCI of a format (e.g., a hypothetical SCI format 1-A) is received (e.g., indicating the candidate resource) in a slot ($t'_m{}^{SL}$) with a Resource reservation period field set to the configured periodicity value and indicates subchannels of the resource pool in the slot. In some examples, the periodicity may be indicated by a higher layer parameter, such as using an sl-ResourceReservePeriodList information element (IE). It is to be understood that the names of IEs described herein may change based on implementation of one or multiple devices (e.g., the UEs), and the examples described herein should not be considered limiting to the scope covered by the claims or the disclosure.

In some examples, the UE may reserve an increased quantity of resources (e.g., time-domain resources) than are to be used at the UE for transmitting sidelink communications. For example, the UE may overbook resources, such that the UE may perform multiple LBT procedures using consecutive time-domain resources (e.g., consecutive slots or consecutive minislots). For example (e.g., as a first step), the UE may perform a resource exclusion procedure relating to half-duplex operations (e.g., similar to a half-duplex constraint) and the inter-RAT interference 605. In some examples, the UE may not sense resources in the presence of relatively high inter-RAT interference 605. As such, resources during which the inter-RAT interference 605 occurs may be excluded (e.g., conservatively excluded) due to the UE not decoding SCIs transmitted using such resources (e.g., during a time period including such resources). In some examples, excluding resources due the inter-RAT interference 605 may degrade performance (e.g., with relatively little gain) and, as such, the UE may refrain from excluding resources during which the inter-RAT interference 605 occurs.

Additionally, or alternatively, in some examples, the UE may exclude resources (e.g., of the resources pool) based on reservations (e.g., the resource set indications 610) received from other UEs (e.g., based on SCIs detected during the sensing window 635). In some examples, the UE may exclude resources based on SCI detected during the sensing window 635 in accordance with (e.g., through applying) one or more rules. For example, the UE may be configured with multiple (e.g., two) thresholds to be used at the UE for determining whether a resource may be excluded from the candidate resource list. A first threshold (e.g., a received power threshold represented as $RSRP_{th1}$) may be used at the UE to exclude reserved resources (through decoding the SCI) from a set of candidate resources (e.g., a candidate resource list). Additionally, or alternatively, the UE may be configured with a second threshold (e.g., a received power threshold represented as $RSRP_{th2}$), that may be used at the UE to determine whether the UE may reserve some overbooked (e.g., oversubscribed) resources of the resource pool (e.g., during the selection window). In some examples, the UE may follow a resource exclusion procedure in which the UE may build a set of candidate resources (e.g., a candidate resource list) from the resources (e.g., candidate resources) which may be reserved by an SCI (e.g., transmitted from other UEs) with a received power that (e.g., in which the measured received power) satisfies (e.g., exceeds) $RSRP_{th1}$. For example, if a quantity of available resources is less than a percentage (e.g., about 20%) of the quantity of resources included in the resource pool, $RSRP_{th1}$ may be reduced (e.g., by about 3 decibels (dB) or an otherwise suitable quantity of dBs). The UE may reduce $RSRP_{th1}$ such that a value of $RSRP_{th1}$ may satisfy (e.g., fall below) $RSRP_{th2}$. In such an example, the UE may include (e.g., begin to include) overbooked (e.g., persistent overbooked) resources in the candidate resource list. That is, the UE may begin to include resources that may be part of a persistent reservation of (e.g., may be overbooked by) another UE, but may not be used at the UE (e.g., may not be used for a transmission from the UE). In some examples, a resource that may be part of a persistent reservation of another UE may not be used if an LBT procedure (e.g., a first LBT attempt) performed at the other UE is successful (e.g., such that the other UE may not use remaining overbooked resources). That is, if an SCI indicating a reserved resource has a received power below $RSRP_{th2}$, the UE may access the reserved resources for persistent access (e.g., may use the resources to perform an LBT procedure to gain access to the channel). In some examples, the UE may use an initial LBT procedure to transmit on the reserved resources (e.g., the UE may be deprioritized in contention for the resources reserved by another UE).

For example, as illustrated in the example of FIG. 6, if a UE that reserved the resource set 615-a performed a transmission 620-a prior to an end of the resource set 615-a, the UE may release remaining resources (e.g., of the resource set 615-a), such that other UEs may use the resources to perform an LBT procedure to gain access to the channel. Additionally, or alternatively, if a UE that reserved the resource set 615-b performed a transmission 620-b prior to an end of the resource set 615-b, the UE may release remaining resources (e.g., of the resource set 615-b), such that other UEs may use the resources to perform an LBT procedure to gain access to the channel.

In some examples, subsequent to performing the resources exclusion procedure (e.g., after excluding resources in the first step), the UE may select a quantity (N) of candidate resources (e.g., from the set of candidate resources). In some examples, the selected resources (N) may be less than a quantity of available resources (e.g., may be less than a maximum quantity of resources ($N_{MAX}$) or an otherwise suitable quantity of resources). Additionally, or alternatively, the quantity (N) of candidate resources (e.g., the size of each candidate resource in the time domain) may be determined (e.g., calculated) at the UE through multiplying a quantity of resources to be used at the UE for transmitting a sidelink signal (e.g., that may fit an expected TB) with a persistence ratio (e.g., adaptive persistence factor, a persistence factor) value. In some examples (e.g., if $RSRP_{th1} < RSRP_{th2}$), the UE may indicate to upper layers (e.g., a PHY layer at the UE may indicate to a MAC layer at the UE) whether a candidate resource is a persistent resource (e.g., overbooked by another UE) or not (e.g., is available). In such an example, the UE may have increased flexibility for candidate resource selection (e.g., for selecting the quantity (N) of candidate resources). For example, the UE may select available resources prior to selecting overbooked resources (e.g., resources owned by another UE, persistent resources reserved by another UE) for transmission.

In some examples, the UE may select (e.g., may begin with) a persistence ratio (P) with a value equal to about 1. In some examples, a persistence ratio with a value of about 1 may correspond to no resource oversubscription (e.g., no overbooked resources, no persistent resources). For example, if the UE experiences relatively little (or no) inter-RAT interference, the UE may refrain from overbooking resources (e.g., may set the value of the persistence ratio to 1). In some other examples, however, the UE may experience increased (e.g., relatively high) inter-RAT interference, such that the UE may not be capable of gaining access to the channel. In such an example, the UE may increase the value of the persistence ratio (P), such that a likelihood of the UE gaining access to the channel (e.g., a likelihood that the UE may win contention) may increase. For example, each time the UE experiences an LBT procedure failure, the PHY layer at the UE may report the LBT procedure failure to the MAC layer at the UE, such as to increase the persistence ratio (P). In some examples, increasing the value of the persistence ratio (P) may increases the likelihood (e.g., probability) that the UE may obtain access to the channel within the contention window (e.g., may make the UE relatively more persistent in contention with other UEs). Additionally, or alternatively, increasing the value of the persistence ratio (P) may prevent competing RATs (e.g., other communication devices using other RATs) from disproportionately occupying the channel. For example, if the UE experiences multiple LBT procedure failures, the other devices (e.g., using relatively more aggressive RATs) may have an increased likelihood of acquiring the channel (e.g., due to the devices refraining from decreasing a backoff window).

In some examples, the UE may increase (e.g., gradually increase), or decrease (e.g., gradually decrease), or both, the value of the persistence ratio (P) based on historical LBT failures experienced at the UE. For example, a value of the persistence ratio (P) may gradually decrease as a sliding window (e.g., based on a parameter such as indicated by an LBTFailureCounter IE or an LBTFailureRate IE) at the UE decreases in value (e.g., indicating reduced activity from interfering RATs, indicated reduced inter-RAT interference 605). That is, if there is a relatively high likelihood that the UE may experience an LBT procedure failure, the value of the persistence ratio (P) may be increased, such as to increase the likelihood that the UE may experience an LBT procedure success. Additionally, or alternatively, if there is a relatively low likelihood that the UE may experience an LBT procedure failure, the value of the persistence ratio (P) may not be increased (or may be decreased), such that the UE may refrain from overbooking resources (or decrease the quantity of overbooked resources).

In some examples, the sliding window may correspond to a time-averaged value of the LBTFailureCounter IE or the LBTFailureRate IE, which may each correspond to (e.g., measure) a quantity of failed LBT attempts and an overall failure rate (e.g., a rate of historical LBT failures experienced at the UE). For example, the UE may measure a channel busy ratio (CBR) by counting a ratio of subchannels experiencing a received signal strength indicator (RSSI) that may be relatively larger than (e.g., exceed) a threshold RSSI value. In some examples, the UE may modify the CBR measurement to exclude RSSI measurements from competing RATs (e.g., devices using RATs different form the UE). For example, inter-RAT interference observed at the UE may not contribute to congestion associated with the RAT used at the UE (e.g., NR congestion) and, as such, the UE may determine to exclude RSSI measurements from the RATs other than the RAT used at the UE. In some examples, the UE may measure an unlicensed CBR (CBR-U), which may be an adjusted CBR calculation that, for example, considers congestion from other SL-U UEs (e.g., excludes other RATs). In some examples, the UE may determine the value of the CBR-U based on measuring a received power (e.g., RSRPs) of SCI transmitted from other UEs. Additionally, or alternatively, the UE may determine a value of the CBR (e.g., including other RATS) and modify the determined CBR to account for an LBT failure ratio, which may approximate congestion from other RATs. In such an example, the UE may determine CBR-U by excluding the approximated congestion from the other RATs from the determined CBR. For example, the UE may determine CBR-U in accordance with Equation 2:

$$CBR-U=\max(0,\alpha*CBR*(1-LBTRailureRate)) \quad (2)$$

where, α may be a term configured for the UE to indicate how aggressive a UE may be for accessing the channel.

In some examples, adjusting the persistence ratio (P) based on historical LBT failures of the UE may increase resource utilization and improve the reliability sidelink communications within a wireless communications system, among other possible benefits.

Figure 7:
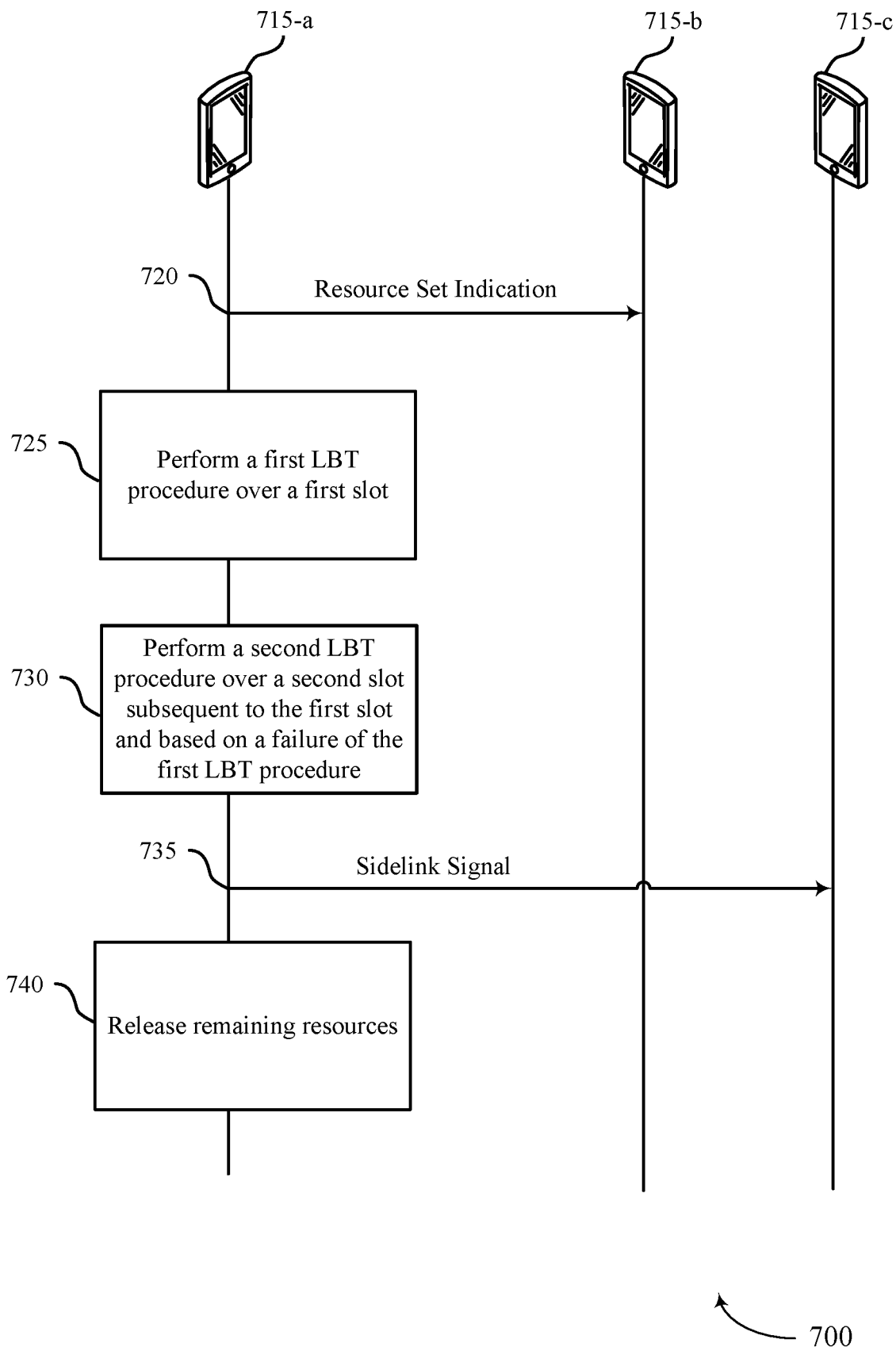
FIGS. 7 and 8 each illustrate an example of a process flow that supports persistent resource access for sidelink in accordance with one or more aspects of the present disclosure.

FIG. 7 illustrates an example of a process flow 700 that supports persistent resource access for sidelink in accordance with one or more aspects of the present disclosure. The process flow 700 may implement or be implemented at or using one or more aspects of the wireless communications system 100 and the wireless communications system 200. For example, the process flow 700 may include a UE 715-a, a UE 715-b, and a UE 715-c, which may be examples of the corresponding devices as described with reference to FIGS. 1 and 2. In the following description of the process flow 700, operations between the UE 715 may occur in a different order or at different times than as shown. Some operations may also be omitted from the process flow 700, and other operations may be added to the process flow 700.

As illustrated in the example of FIG. 7, the UE 715-a may be configured with a framework for overbooking resources of the unlicensed spectrum to transmit sidelink communications. For example, the UE 715-a may reserve an increased amount of resources (e.g., time-domain resources) than may be used at the UE 715-a for transmitting sidelink communications (e.g., may overbook resources), such that the UE 715-a may perform multiple LBT procedures using consecutive resources (e.g., consecutive slots or consecutive minislots) reserved at the UE 715-a. For example, at 720, the UE 715-a may transmit a sidelink signal including a resource set indication of a set of resources that are reserved at the UE 715-a for sidelink communications.

In some examples, the resource set indication (e.g., transmitted from the UE 715-a at 720) may be an example of a resource set indication as described with reference to FIGS. 2A, 2B, 3A, 3B, 4, 5, and 6. For example, the resource set indication may be transmitted using an SCI and may include a first TDRA corresponding to a sidelink signal (e.g., to be transmitted from the UE 715-a) and an overbooking indication. In some examples, the overbooking indication may include a persistence ratio indicating a ratio between a second TDRA (e.g., corresponding to an entirety of the set of resources indicated using the resource set indication, corresponding to a PTDRA) and the first TDRA (e.g., corresponding to the sidelink signal to be transmitted from the UE 715-a). The persistence ratio may be an example of a persistence ratio as described with reference to FIGS. 2A, 2B, 3A, 3B, 4, 5, and 6. For example, the persistence ratio may be based on a historical LBT failure rate associated with the UE 715-a. In some examples, the historical LBT failure rate may be based on a CBR associated with sidelink signals from one or more other UEs. Additionally, or alternatively, the CBR may be an example of a CBR-U as described with reference to FIG. 6. For example, the CBR may be adjusted to exclude traffic from RATs other than the RAT used for the sidelink communications from the UE 715-a.

In some examples, the UE 715-a may perform at least two LBT procedures using respective consecutive slots (or minislots) of the set of resources. For example, at 725, the UE 715-a may perform a first LBT procedure over a first slot and, at 730, the UE 715-a may perform a second LBT procedure over a second slot subsequent to the first slot and based on a failure of the first LBT procedure. In some examples, the first LBT procedure and the second LBT procedure may be examples of an initial LBT procedure and a persistent LBT procedure, respectively, as described with reference to FIGS. 3A, 3B, and 4. For example, the first LBT procedure may occur at a first temporal distance from the first slot (or minislot) of the set of resources and the second LBT procedure occurs at a second temporal distance (e.g., greater than the first temporal distance) from the second slot (or minislot) subsequent to the first slot. Additionally, or alternatively, the first LBT procedure may occurs during a first contention window and the second LBT procedure may occurs during a second contention window (e.g., shorter than the first contention window). In some examples, the UE 715-a may perform the first LBT procedure and the second LBT procedure based on a HARQ status associated with the sidelink signal to be transmitted from the UE 715-a.

In some examples, the second LBT procedure performed at 730 may be successful. Therefore, at 735, the UE 715-a may transmit the sidelink signal to the UE 715-c. In some examples, the UE 715-a may transmit the sidelink signal using a portion of the set of resources following the second LBT procedure (e.g., performed at 730). At 740, the UE 715-a may release remaining resources (e.g., a remaining portion of the set of resources) after transmitting the sidelink signal. For example, the UE 715-a may release the remaining resources, such that the remaining resources may be used by another UE for gaining access to the channel. In some examples, releasing remaining resources may increase resource utilization within a wireless communications system, among other possible benefits.

Figure 8:
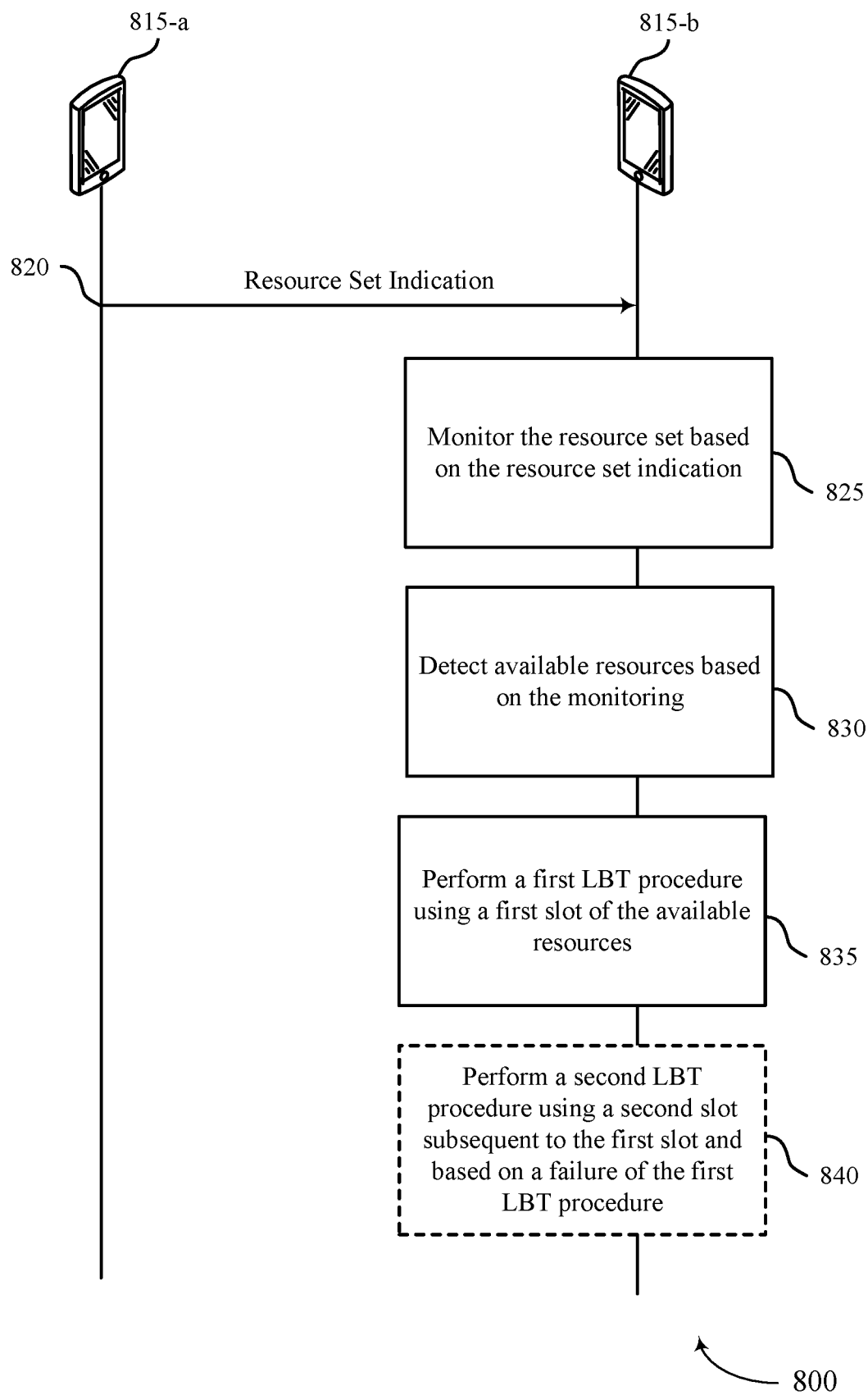

FIG. 8 illustrates an example of a process flow 800 that supports persistent resource access for sidelink in accordance with one or more aspects of the present disclosure. The process flow 800 may implement or be implemented at or using one or more aspects of the wireless communications system 100 and the wireless communications system 200. For example, the process flow 800 may include a UE 815-a and a UE 815-b, which may be examples of the corresponding devices as described with reference to FIGS. 1 and 2. In the following description of the process flow 800, operations between the UE 815 may occur in a different order or at different times than as shown. Some operations may also be omitted from the process flow 800, and other operations may be added to the process flow 700.

As illustrated in the example of FIG. 8, the UE 815-b may be configured with a framework for accessing overbooked resources (e.g., persistent resources) of the unlicensed spectrum. For example, at 820, the UE 815-b may receive a sidelink signal including a resource set indication of a set of resources that are reserved at the UE 815-a for sidelink communications. In some examples, the resource set indication (e.g., received at the UE 815-b at 820) may be an example of a resource set indication as described with reference to FIGS. 2A, 2B, 3A, 3B, 4, 5, and 6. For example, the resource set indication may be transmitted using an SCI and may include a first TDRA corresponding to a sidelink signal (e.g., to be transmitted from the UE 815-a) and an overbooking indication. In some examples, the overbooking indication may include a persistence ratio indicating a ratio between a second TDRA (e.g., corresponding to an entirety of the set of resources indicated using the resource set indication, corresponding to a PTDRA) and the first TDRA (e.g., corresponding to the sidelink signal to be transmitted from the UE 815-a).

At 825, the UE 815-a may monitor the set of resources (e.g., during a sensing window) based on the resource set indication. In some examples, the UE 815-a may select the set of resources (e.g., for monitoring at 825) based on a received power associated with the sidelink signal satisfying a threshold for reserving overbooked resources. In some examples, the threshold may be an example of a threshold as described with reference to FIG. 6. For example, the threshold may be a received power threshold used at the UE 815-b for determining whether a resource may be excluded from a candidate resource list. Additionally, or alternatively, the set of resources may include resources that are overbooked at the UE 815-a.

At 830, the UE 815-b may detect a portion of available resources of the set of resources based on the monitoring. In some examples, the portion of available resources may be available for the UE 815-b to use for first sidelink communications based on overbooking at the UE 815-a. For example, the portion of available resources may have been released at the UE 815-a following an end of the second sidelink communications at the UE 815-a. In some examples, the UE 815-b may perform at least one LBT procedure using the portion of available resources (e.g., based on the detecting). For example, at 835, the UE 815-a may perform a first LBT procedure using a first slot of the portion of available resources. In some examples (e.g., if the first LBT procedure fails), the UE 815-b may perform another LBT procedure. For example, at 840, the UE 815-b may perform a second LBT procedure using a second slot subsequent to the first slot and based on a failure of the first LBT procedure.

In some examples, the first LBT procedure (e.g., performed at 835) and the second LBT procedure (e.g., performed at 840) may be examples of an initial LBT procedure and a persistent LBT procedure, respectively, as described with reference to FIGS. 3A, 3B, and 4. For example, the first LBT procedure may occur at a first temporal distance from a first slot boundary of a first slot (or minislot) of the set of resources and the second LBT procedure occurs at a second temporal distance (e.g., greater than the first temporal distance) from a second slot (or minislot) subsequent to the first slot. Additionally, or alternatively, the first LBT procedure may occurs during a first contention window and the second LBT procedure may occurs during a second contention window (e.g., shorter than the first contention window).

In some examples, the UE 815-b may perform the first LBT procedure and the second LBT procedure based on a HARQ status associated with a sidelink signal to be transmitted from the UE 815-b. For example, the first LBT procedure (e.g., performed at 835 may be an initial LBT procedure based on a sidelink signal (e.g., a TB of a sidelink signal) to be transmitted by the UE 815-b having a HARQ not pending status. In such an example, the first LBT procedure may fail due to the UE 815-a (e.g., the resource owner) performing a persistent LBT procedure (e.g., based on a sidelink signal to be transited by the UE 815-a having a HARQ pending status) and gaining access to the channel (e.g., winning contention to the resource). In such an example, the UE 815-b may reserve (e.g., obtain) remaining resources (e.g., remaining slots, the portion of available resources) and may perform the second LBT procedure (e.g., a persistent LBT procedure) at 840. In some other examples, the UE 815-b may perform the second LBT procedure (e.g., a persistent LBT procedure) over resources not reserved by another UE (e.g., not reserved by the UE 815-a). In some examples, using the portion of available resources for performing at least one LBT procedure may increase resource utilization within a wireless communications system, among other possible benefits.

Figure 9:
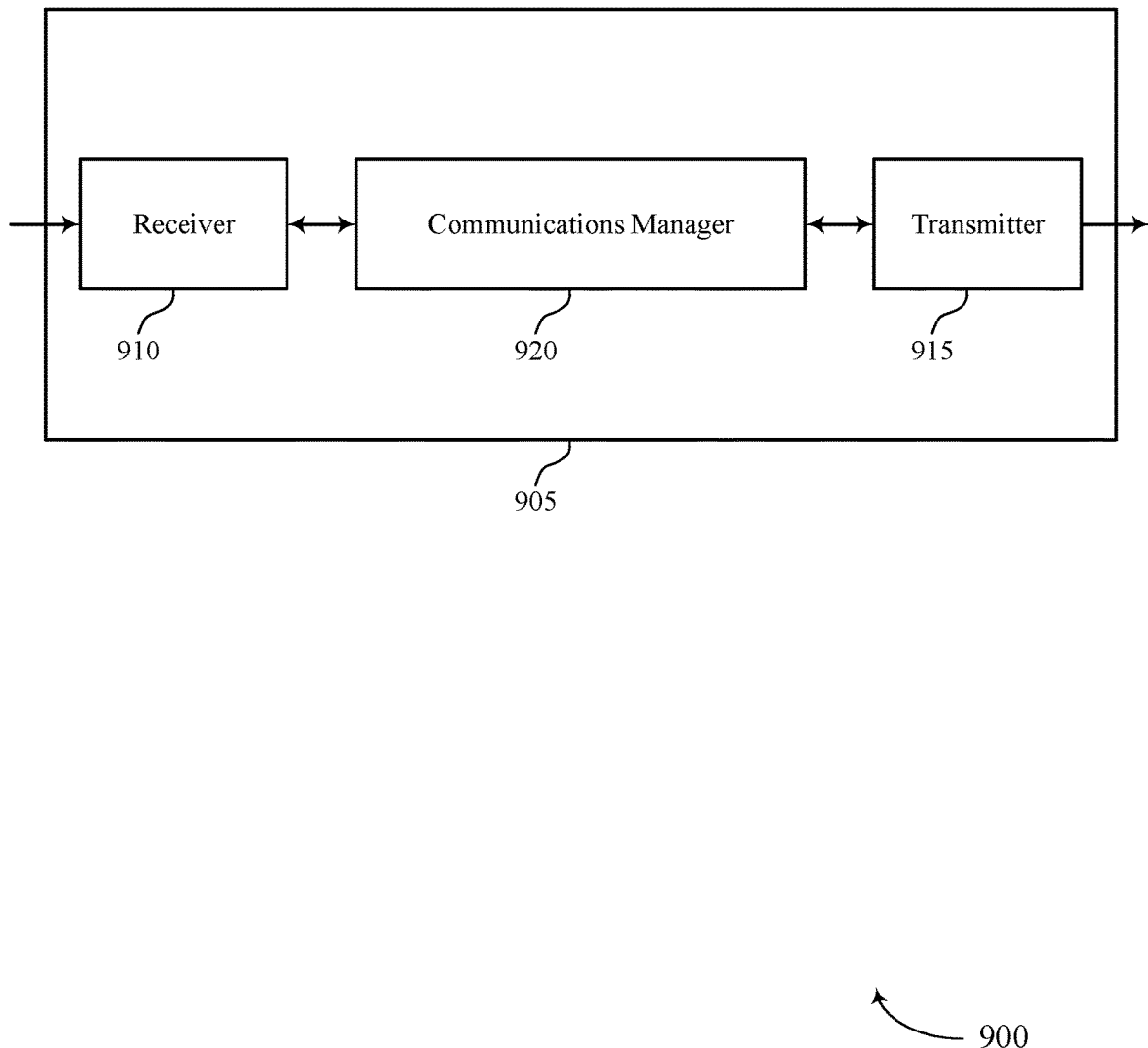
FIGS. 9 and 10 show block diagrams of devices that support persistent resource access for sidelink in accordance with one or more aspects of the present disclosure.

FIG. 9 shows a block diagram 900 of a device 905 that supports persistent resource access for sidelink in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to persistent resource access for sidelink). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to persistent resource access for sidelink). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of persistent resource access for sidelink as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE (e.g., the device 905) in accordance with examples as disclosed herein. For example, the communications manager 920 may be configured as or otherwise support a means for transmitting a first sidelink signal including an indication of a set of resources that are reserved by the UE for sidelink communications. The communications manager 920 may be configured as or otherwise support a means for performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures. The communications manager 920 may be configured as or otherwise support a means for transmitting a second sidelink signal over a portion of the set of resources following the at least two LBT procedures, where a remaining portion of the set of resources is released after transmitting the second sidelink signal, the remaining portion following transmission of the second sidelink signal.

Additionally, or alternatively, the communications manager 920 may support wireless communication at a first UE (e.g., another device 905) in accordance with examples as disclosed herein. For example, the communications manager 920 may be configured as or otherwise support a means for receiving, from a second UE (e.g., the device 905), a sidelink signal including an indication of a set of resources that are reserved by the second UE for second sidelink communications. The communications manager 920 may be configured as or otherwise support a means for monitoring the set of resources based on the indication. The communications manager 920 may be configured as or otherwise support a means for detecting a portion of available resources of the set of resources based on the monitoring, where the portion of available resources are available for the first UE to use for first sidelink communications based on overbooking by the second UE, and where the portion of available resources follow an end of the second sidelink communications by the second UE. The communications manager 920 may be configured as or otherwise support a means for performing at least one LBT procedure over the portion of available resources based on the detecting.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

Figure 10:
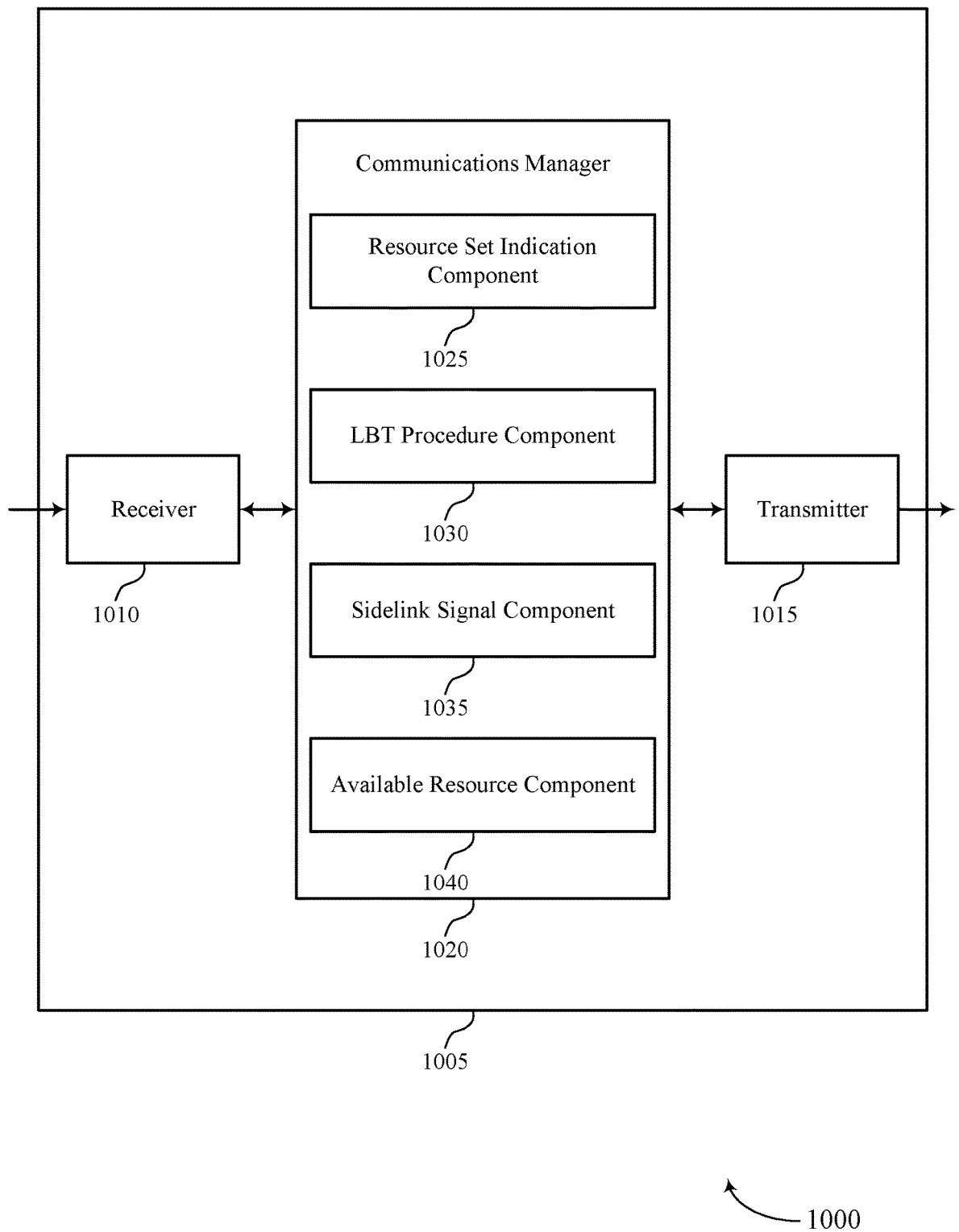

FIG. 10 shows a block diagram 1000 of a device 1005 that supports persistent resource access for sidelink in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to persistent resource access for sidelink). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to persistent resource access for sidelink). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of persistent resource access for sidelink as described herein. For example, the communications manager 1020 may include a resource set indication component 1025, an LBT procedure component 1030, a sidelink signal component 1035, an available resource component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE (e.g., the device 1005) in accordance with examples as disclosed herein. The resource set indication component 1025 may be configured as or otherwise support a means for transmitting a first sidelink signal including an indication of a set of resources that are reserved by the UE for sidelink communications. The LBT procedure component 1030 may be configured as or otherwise support a means for performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures. The sidelink signal component 1035 may be configured as or otherwise support a means for transmitting a second sidelink signal over a portion of the set of resources following the at least two LBT procedures, where a remaining portion of the set of resources is released after transmitting the second sidelink signal, the remaining portion following transmission of the second sidelink signal.

Additionally, or alternatively, the communications manager 1020 may support wireless communication at a first UE (e.g., another device 1005) in accordance with examples as disclosed herein. The resource set indication component 1025 may be configured as or otherwise support a means for receiving, from a second UE (e.g., the device 1005), a sidelink signal including an indication of a set of resources that are reserved by the second UE for second sidelink communications. The resource set indication component 1025 may be configured as or otherwise support a means for monitoring the set of resources based on the indication. The available resource component 1040 may be configured as or otherwise support a means for detecting a portion of available resources of the set of resources based on the monitoring, where the portion of available resources are available for the first UE to use for first sidelink communications based on overbooking by the second UE, and where the portion of available resources follow an end of the second sidelink communications by the second UE. The LBT procedure component 1030 may be configured as or otherwise support a means for performing at least one LBT procedure over the portion of available resources based on the detecting.

Figure 11:
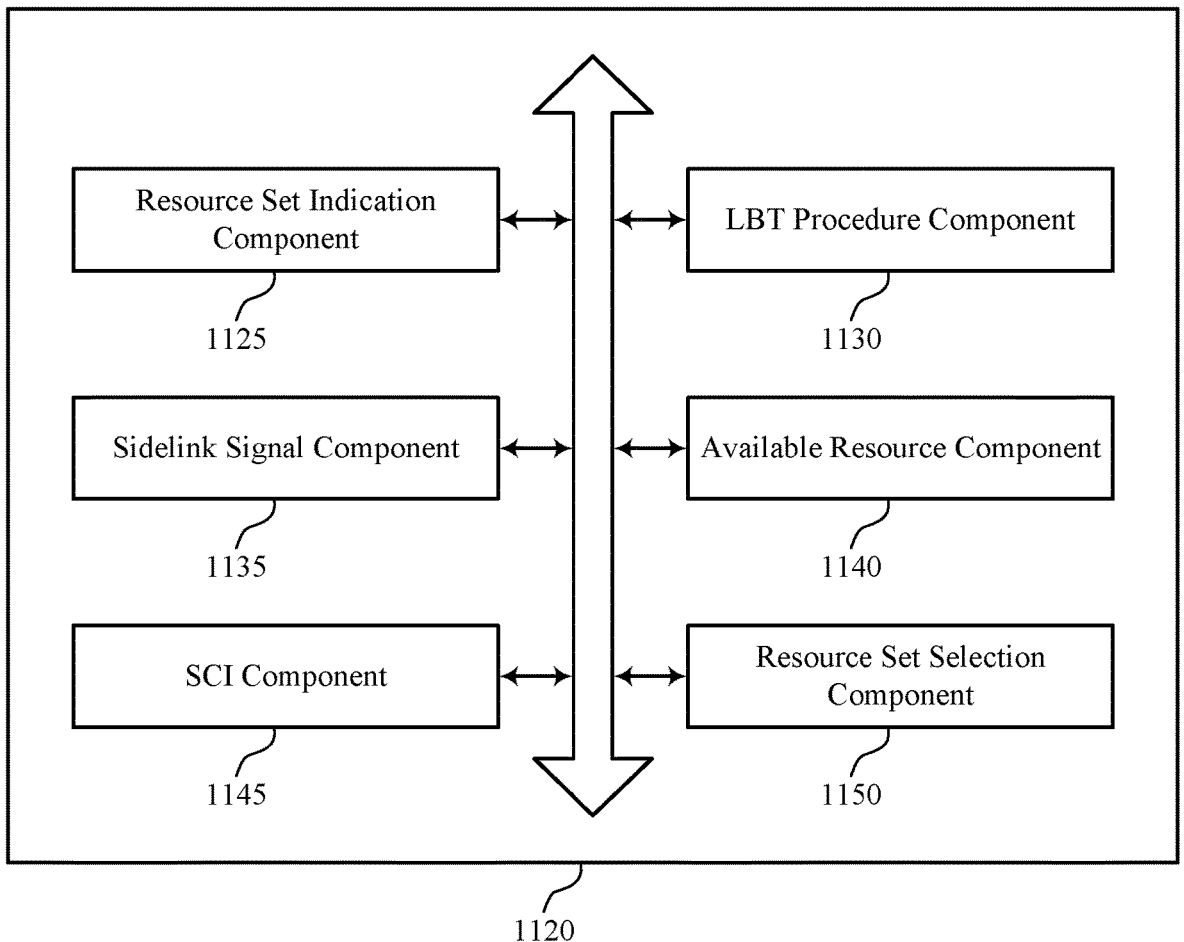
FIG. 11 shows a block diagram of a communications manager that supports persistent resource access for sidelink in accordance with one or more aspects of the present disclosure.

FIG. 11 shows a block diagram 1100 of a communications manager 1120 that supports persistent resource access for sidelink in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of persistent resource access for sidelink as described herein. For example, the communications manager 1120 may include a resource set indication component 1125, an LBT procedure component 1130, a sidelink signal component 1135, an available resource component 1140, an SCI component 1145, a resource set selection component 1150, or any combination thereof. Each of these components may communicate, directly or indirectly, with one another (e.g., via one or more buses).

The communications manager 1120 may support wireless communication at a UE in accordance with examples as disclosed herein. The resource set indication component 1125 may be configured as or otherwise support a means for transmitting a first sidelink signal including an indication of a set of resources that are reserved by the UE for sidelink communications. The LBT procedure component 1130 may be configured as or otherwise support a means for performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures. The sidelink signal component 1135 may be configured as or otherwise support a means for transmitting a second sidelink signal over a portion of the set of resources following the at least two LBT procedures, where a remaining portion of the set of resources is released after transmitting the second sidelink signal, the remaining portion following transmission of the second sidelink signal.

In some examples, to support transmitting the first sidelink signal, the SCI component 1145 may be configured as or otherwise support a means for transmitting, via the first sidelink signal, SCI including a first TDRA corresponding to the second sidelink signal and an overbooking indication, where the performing the at least two LBT procedures is based on the overbooking indication.

In some examples, the overbooking indication includes a persistence ratio indicating a ratio between a second TDRA corresponding to an entirety of the set of resources and the first TDRA corresponding to the second sidelink signal. In some examples, the persistence ratio is based on a historical LBT failure rate associated with the UE. In some examples, the historical LBT failure rate is based on a CBR associated with one or more of sidelink signals from one or more other UEs. In some examples, the UE is associated with a first RAT and the CBR is adjusted to exclude traffic from RATs other than the first RAT.

In some examples, the overbooking indication includes a second TDRA corresponding to an entirety of the set of resources. In some examples, the performing the at least two LBT procedures is further based on a HARQ state associated with the second sidelink signal. In some examples, the first LBT procedure occurs at a first temporal distance from a first slot boundary of a first slot of the set of resources and the second LBT procedure occurs at a second temporal distance from a second slot boundary of a second slot of the set of resources subsequent to the first slot. In some examples, the second temporal distance is greater than the first temporal distance.

In some examples, the LBT procedure component 1130 may be configured as or otherwise support a means for transmitting a cyclic prefix extension subsequent to the second LBT procedure and prior to a beginning slot of the second sidelink signal based on a success of the second LBT procedure. In some examples, the first LBT procedure occurs over a first contention window and the second LBT procedure occurs over a second contention window, the first contention window being longer than the second contention window.

Additionally, or alternatively, the communications manager 1120 may support wireless communication at a first UE in accordance with examples as disclosed herein. In some examples, the resource set indication component 1125 may be configured as or otherwise support a means for receiving, from a second UE, a sidelink signal including an indication of a set of resources that are reserved by the second UE for second sidelink communications. In some examples, the resource set indication component 1125 may be configured as or otherwise support a means for monitoring the set of resources based on the indication. The available resource component 1140 may be configured as or otherwise support a means for detecting a portion of available resources of the set of resources based on the monitoring, where the portion of available resources are available for the first UE to use for first sidelink communications based on overbooking by the second UE, and where the portion of available resources follow an end of the second sidelink communications by the second UE. In some examples, the LBT procedure component 1130 may be configured as or otherwise support a means for performing at least one LBT procedure over the portion of available resources based on the detecting.

In some examples, the resource set selection component 1150 may be configured as or otherwise support a means for selecting the set of resources based on a received power associated with the sidelink signal satisfying a threshold for reserving overbooked resources, where monitoring the set of resources is based on the selection. In some examples, selecting the set of resources is further based on the set of resources including resources that are overbooked by the second UE.

In some examples, to support receiving the sidelink signal, the SCI component 1145 may be configured as or otherwise support a means for receiving, via the sidelink signal, SCI including a first TDRA corresponding to the second sidelink communications by the second UE and an overbooking indication, where detecting the portion of available resources is based on the SCI.

In some examples, the overbooking indication includes a persistence ratio indicating a ratio between a second TDRA corresponding to an entirety of the set of resources and the first TDRA corresponding to the second sidelink communications by the second UE. In some examples, the overbooking indication includes a second TDRA corresponding to an entirety of the set of resources. In some examples, performing the at least one LBT procedure is based on a HARQ state associated with a second sidelink signal to be transmitted by the first UE.

In some examples, to support performing the at least one LBT procedure, the LBT procedure component 1130 may be configured as or otherwise support a means for performing a second LBT procedure of the at least one LBT procedure based on a failure of a first LBT procedure of the at least one LBT procedure, where the first LBT procedure and the second LBT procedure are performed over respective consecutive slots, each slot of the respective consecutive slots including at least one resource of the portion of available resources.

In some examples, the first LBT procedure occurs at a first temporal distance from a first slot boundary of a first slot of the portion of available resources and the second LBT procedure occurs at a second temporal distance from a second slot boundary of a second slot of the portion of available resources subsequent to the first slot. In some examples, the second temporal distance is greater than the first temporal distance. In some examples, the LBT procedure component 1130 may be configured as or otherwise support a means for transmitting a CPE subsequent to the second LBT procedure and based on a success of the second LBT procedure. In some examples, the first LBT procedure occurs over a first contention window and the second LBT procedure occurs over a second contention window, the first contention window being longer than the second contention window.

Figure 12:
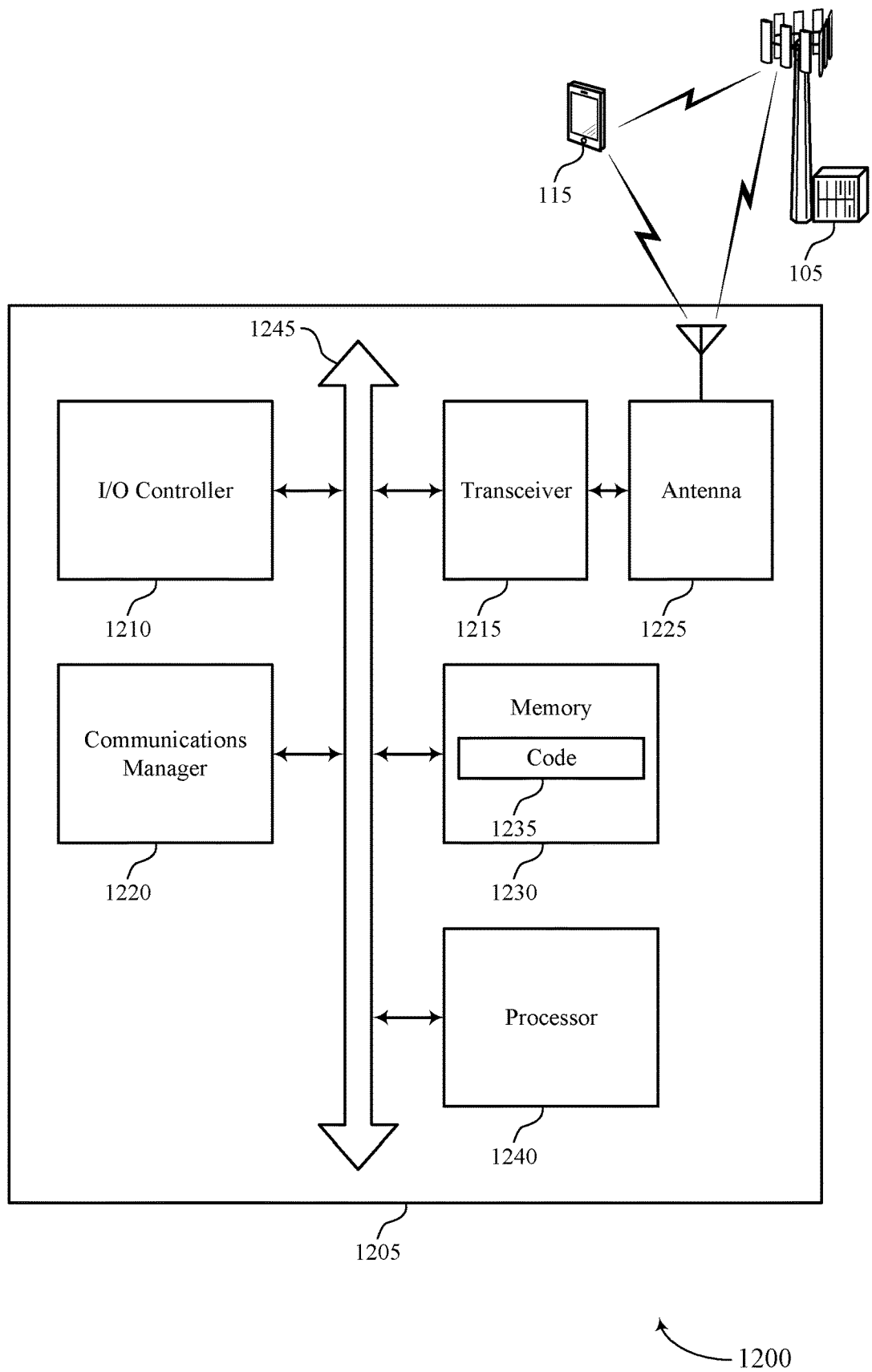
FIG. 12 shows a diagram of a system including a device that supports persistent resource access for sidelink in accordance with one or more aspects of the present disclosure.

FIG. 12 shows a diagram of a system 1200 including a device 1205 that supports persistent resource access for sidelink in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting persistent resource access for sidelink). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE (e.g., the device 1205) in accordance with examples as disclosed herein. For example, the communications manager 1220 may be configured as or otherwise support a means for transmitting a first sidelink signal including an indication of a set of resources that are reserved by the UE for sidelink communications. The communications manager 1220 may be configured as or otherwise support a means for performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures. The communications manager 1220 may be configured as or otherwise support a means for transmitting a second sidelink signal over a portion of the set of resources following the at least two LBT procedures, where a remaining portion of the set of resources is released after transmitting the second sidelink signal, the remaining portion following transmission of the second sidelink signal.

Additionally, or alternatively, the communications manager 1220 may support wireless communication at a first UE (e.g., another device 1205) in accordance with examples as disclosed herein. For example, the communications manager 1220 may be configured as or otherwise support a means for receiving, from a second UE (e.g., the device 1205), a sidelink signal including an indication of a set of resources that are reserved by the second UE for second sidelink communications. The communications manager 1220 may be configured as or otherwise support a means for monitoring the set of resources based on the indication. The communications manager 1220 may be configured as or otherwise support a means for detecting a portion of available resources of the set of resources based on the monitoring, where the portion of available resources are available for the first UE to use for first sidelink communications based on overbooking by the second UE, and where the portion of available resources follow an end of the second sidelink communications by the second UE. The communications manager 1220 may be configured as or otherwise support a means for performing at least one LBT procedure over the portion of available resources based on the detecting.

By including or configuring the communications manager 1220 in accordance with examples as described herein, the device 1205 may support techniques for improved communication reliability, reduced latency, more efficient utilization of communication resources, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of persistent resource access for sidelink as described herein, or the processor 1240 and the memory 1230 may be otherwise configured to perform or support such operations.

Figure 13:
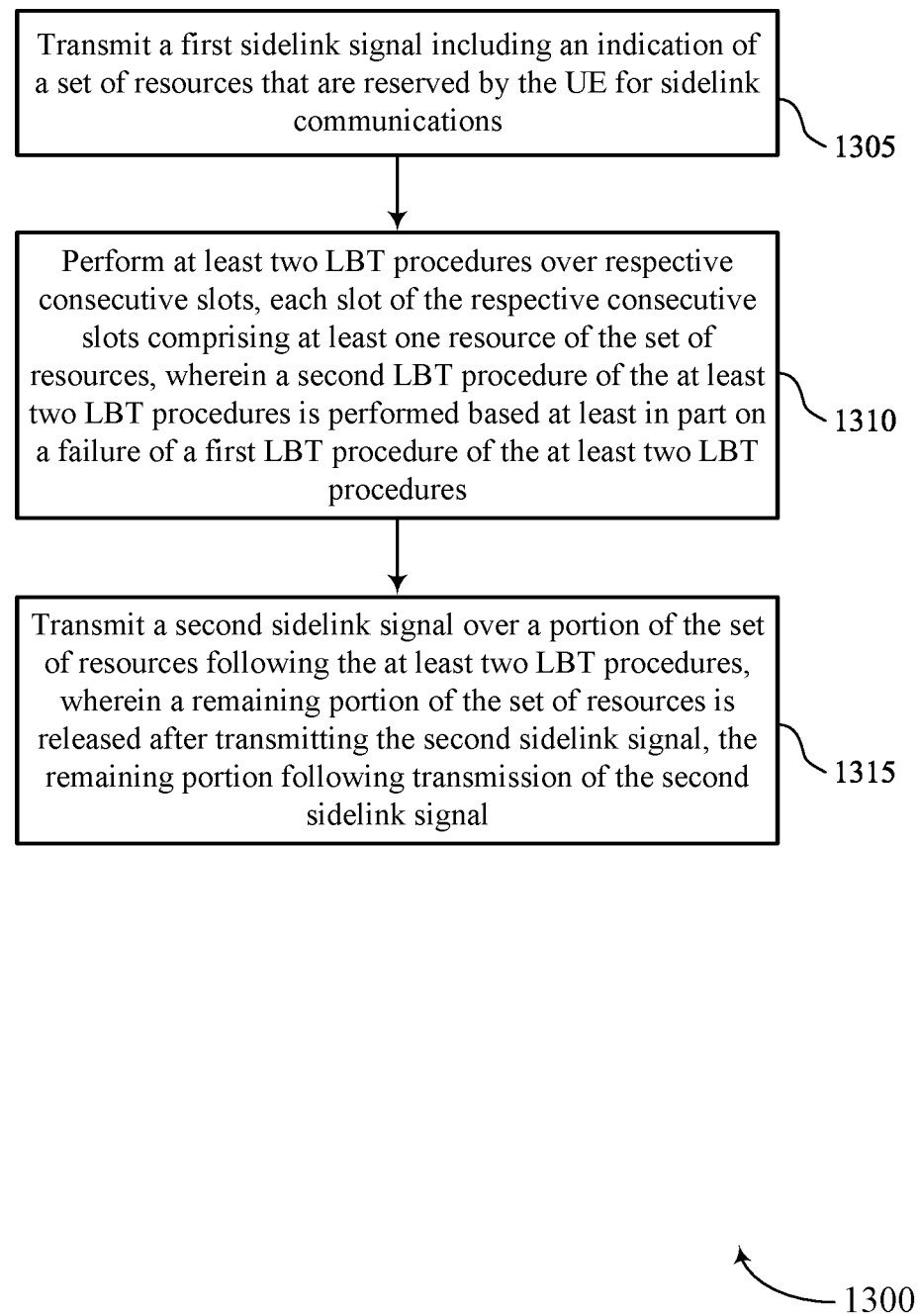
FIGS. 13 through 16 show flowcharts illustrating methods that support persistent resource access for sidelink in accordance with one or more aspects of the present disclosure.

FIG. 13 shows a flowchart illustrating a method 1300 that supports persistent resource access for sidelink in accordance with one or more aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include transmitting a first sidelink signal including an indication of a set of resources that are reserved by the UE for sidelink communications. The operations of 1305 may be performed in accordance with examples as disclosed herein. In some examples, aspects of the operations of 1305 may be performed by a resource set indication component 1125 as described with reference to FIG. 11.

At 1310, the method may include performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures. The operations of 1310 may be performed in accordance with examples as disclosed herein. In some examples, aspects of the operations of 1310 may be performed by an LBT procedure component 1130 as described with reference to FIG. 11.

At 1315, the method may include transmitting a second sidelink signal over a portion of the set of resources following the at least two LBT procedures, where a remaining portion of the set of resources is released after transmitting the second sidelink signal, the remaining portion following transmission of the second sidelink signal. The operations of 1315 may be performed in accordance with examples as disclosed herein. In some examples, aspects of the operations of 1315 may be performed by a sidelink signal component 1135 as described with reference to FIG. 11.

Figure 14:
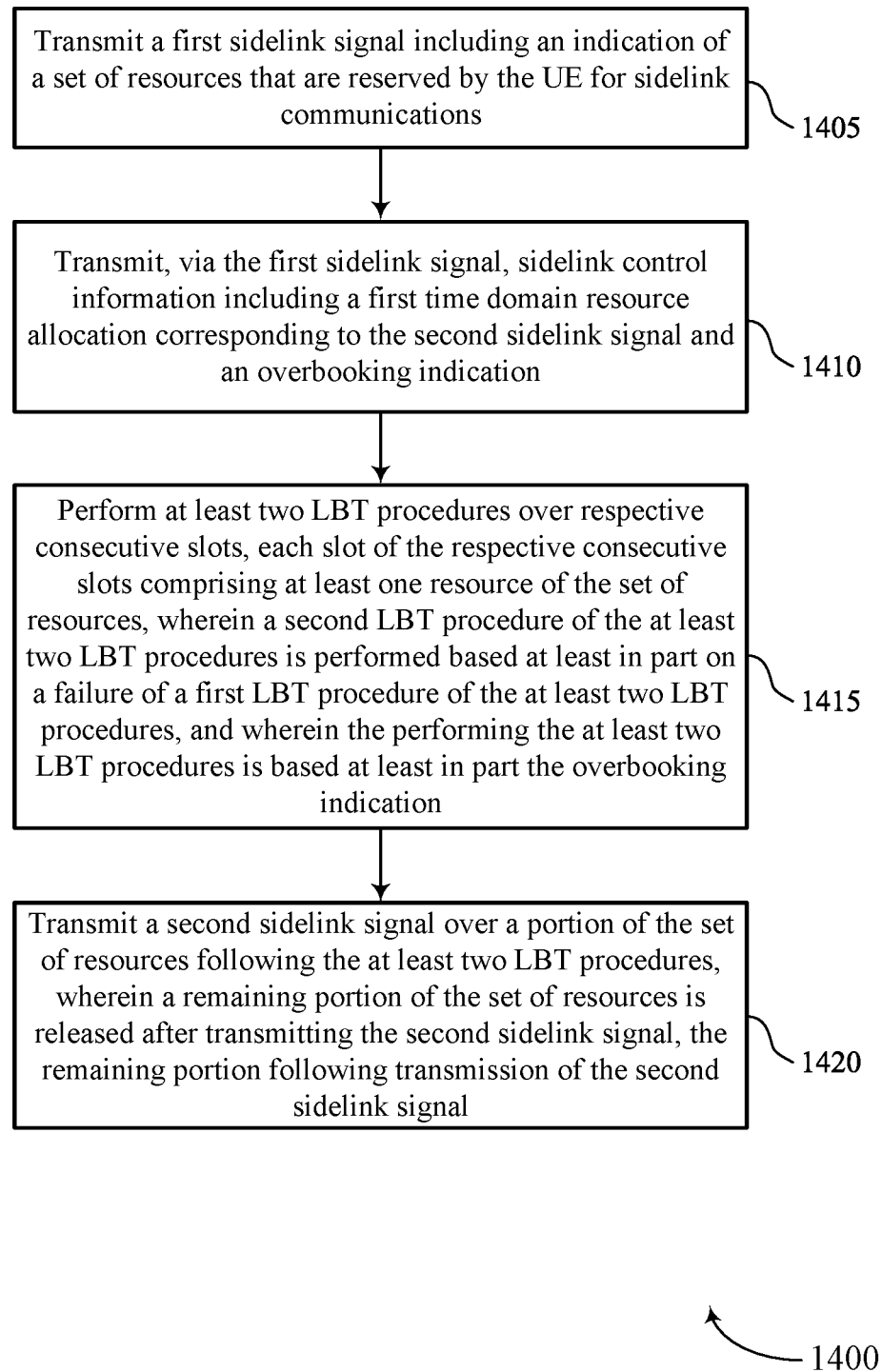

FIG. 14 shows a flowchart illustrating a method 1400 that supports persistent resource access for sidelink in accordance with one or more aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include transmitting a first sidelink signal including an indication of a set of resources that are reserved by the UE for sidelink communications. The operations of 1405 may be performed in accordance with examples as disclosed herein. In some examples, aspects of the operations of 1405 may be performed by a resource set indication component 1125 as described with reference to FIG. 11.

At 1410, the method may include transmitting, via the first sidelink signal, SCI including a first TDRA corresponding to the second sidelink signal and an overbooking indication. The operations of 1410 may be performed in accordance with examples as disclosed herein. In some examples, aspects of the operations of 1410 may be performed by an SCI component 1145 as described with reference to FIG. 11.

At 1415, the method may include performing at least two LBT procedures over respective consecutive slots, each slot of the respective consecutive slots including at least one resource of the set of resources, where a second LBT procedure of the at least two LBT procedures is performed based on a failure of a first LBT procedure of the at least two LBT procedures, and where the performing the at least two LBT procedures is based on the overbooking indication. The operations of 1415 may be performed in accordance with examples as disclosed herein. In some examples, aspects of the operations of 1415 may be performed by an LBT procedure component 1130 as described with reference to FIG. 11.

At 1420, the method may include transmitting a second sidelink signal over a portion of the set of resources following the at least two LBT procedures, where a remaining portion of the set of resources is released after transmitting the second sidelink signal, the remaining portion following transmission of the second sidelink signal. The operations of 1420 may be performed in accordance with examples as disclosed herein. In some examples, aspects of the operations of 1420 may be performed by a sidelink signal component 1135 as described with reference to FIG. 11.

Figure 15:
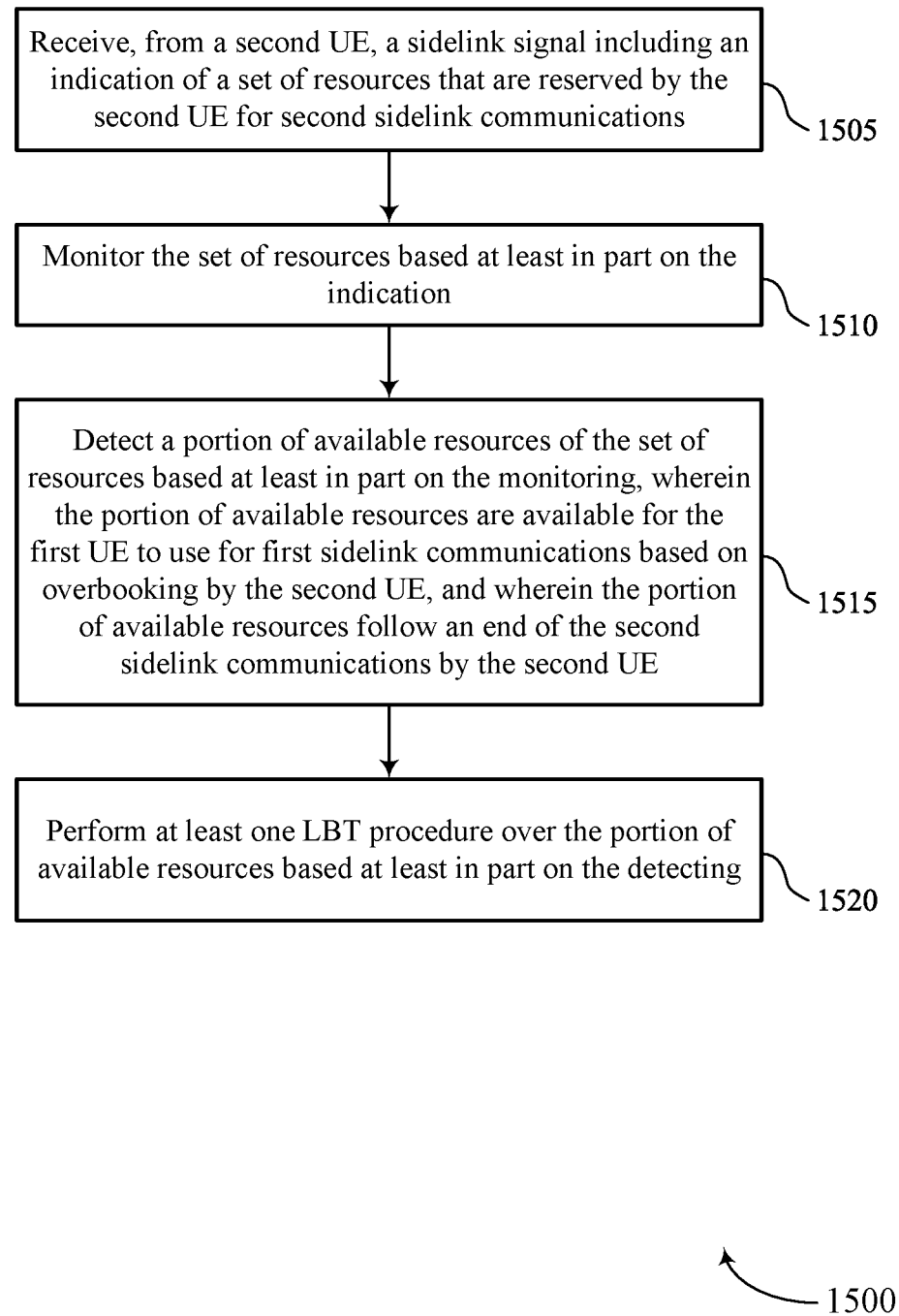

FIG. 15 shows a flowchart illustrating a method 1500 that supports persistent resource access for sidelink in accordance with one or more aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1505, the method may include receiving, from a second UE, a sidelink signal including an indication of a set of resources that are reserved by the second UE for second sidelink communications. The operations of 1505 may be performed in accordance with examples as disclosed herein. In some examples, aspects of the operations of 1505 may be performed by a resource set indication component 1125 as described with reference to FIG. 11.

At 1510, the method may include monitoring the set of resources based on the indication. The operations of 1510 may be performed in accordance with examples as disclosed herein. In some examples, aspects of the operations of 1510 may be performed by a resource set indication component 1125 as described with reference to FIG. 11.

At 1515, the method may include detecting a portion of available resources of the set of resources based on the monitoring, where the portion of available resources are available for the first UE to use for first sidelink communications based on overbooking by the second UE, and where the portion of available resources follow an end of the second sidelink communications by the second UE. The operations of 1515 may be performed in accordance with examples as disclosed herein. In some examples, aspects of the operations of 1515 may be performed by an available resource component 1140 as described with reference to FIG. 11.

At 1520, the method may include performing at least one LBT procedure over the portion of available resources based on the detecting. The operations of 1520 may be performed in accordance with examples as disclosed herein. In some examples, aspects of the operations of 1520 may be performed by an LBT procedure component 1130 as described with reference to FIG. 11.

Figure 16:
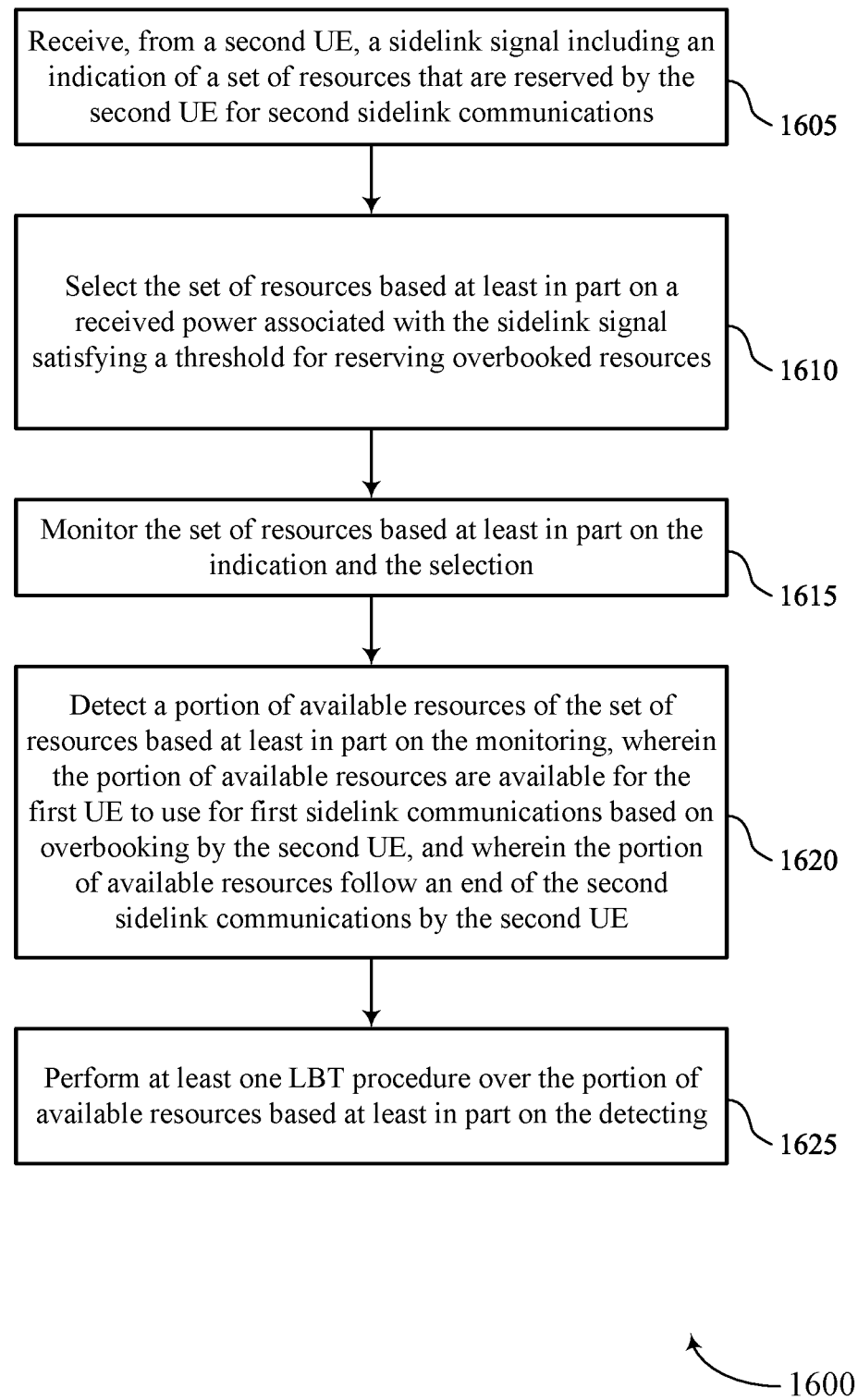

FIG. 16 shows a flowchart illustrating a method 1600 that supports persistent resource access for sidelink in accordance with one or more aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1605, the method may include receiving, from a second UE, a sidelink signal including an indication of a set of resources that are reserved by the second UE for second sidelink communications. The operations of 1605 may be performed in accordance with examples as disclosed herein. In some examples, aspects of the operations of 1605 may be performed by a resource set indication component 1125 as described with reference to FIG. 11.

At 1610, the method may include selecting the set of resources based on a received power associated with the sidelink signal satisfying a threshold for reserving overbooked resources. The operations of 1610 may be performed in accordance with examples as disclosed herein. In some examples, aspects of the operations of 1610 may be performed by a resource set selection component 1150 as described with reference to FIG. 11.

At 1615, the method may include monitoring the set of resources based on the indication and the selection. The operations of 1615 may be performed in accordance with examples as disclosed herein. In some examples, aspects of the operations of 1615 may be performed by a resource set indication component 1125 as described with reference to FIG. 11.

At 1620, the method may include detecting a portion of available resources of the set of resources based on the monitoring, where the portion of available resources are available for the first UE to use for first sidelink communications based on overbooking by the second UE, and where the portion of available resources follow an end of the second sidelink communications by the second UE. The operations of 1620 may be performed in accordance with examples as disclosed herein. In some examples, aspects of the operations of 1620 may be performed by an available resource component 1140 as described with reference to FIG. 11.

At 1625, the method may include performing at least one LBT procedure over the portion of available resources based on the detecting. The operations of 1625 may be performed in accordance with examples as disclosed herein. In some examples, aspects of the operations of 1625 may be performed by an LBT procedure component 1130 as described with reference to FIG. 11.

The following provides an overview of aspects of the present disclosure:

Aspect 1: A method for wireless communication at a UE, comprising: transmitting a first sidelink signal including an indication of a set of resources that are reserved by the UE for sidelink communications; performing at least two LBT procedures over respective consecutive slots, each slot of the respective consecutive slots comprising at least one resource of the set of resources, wherein a second LBT procedure of the at least two LBT procedures is performed based at least in part on a failure of a first LBT procedure of the at least two LBT procedures; and transmitting a second sidelink signal over a portion of the set of resources following the at least two LBT procedures, wherein a remaining portion of the set of resources is released after transmitting the second sidelink signal, the remaining portion following transmission of the second sidelink signal.

Aspect 2: The method of aspect 1, wherein transmitting the first sidelink signal comprises: transmitting, via the first sidelink signal, SCI including a first TDRA corresponding to the second sidelink signal and an overbooking indication, wherein the performing the at least two LBT procedures is based at least in part on the overbooking indication.

Aspect 3: The method of aspect 2, wherein the overbooking indication comprises a persistence ratio indicating a ratio between a second TDRA corresponding to an entirety of the set of resources and the first TDRA corresponding to the second sidelink signal.

Aspect 4: The method of aspect 3, wherein the persistence ratio is based at least in part on a historical LBT failure rate associated with the UE.

Aspect 5: The method of aspect 4, wherein the historical LBT failure rate is based at least in part on a CBR associated with one or more of sidelink signals from one or more other UEs.

Aspect 6: The method of aspect 5, wherein the UE is associated with a first RAT and the CBR is adjusted to exclude traffic from RATs other than the first RAT.

Aspect 7: The method of aspect 2, wherein the overbooking indication comprises a second TDRA corresponding to an entirety of the set of resources.

Aspect 8: The method of any of aspects 1 through 7, wherein the performing the at least two LBT procedures is further based at least in part on a HARQ state associated with the second sidelink signal.

Aspect 9: The method of any of aspects 1 through 8, wherein the first LBT procedure occurs at a first temporal distance from a first slot boundary of a first slot of the set of resources and the second LBT procedure occurs at a second temporal distance from a second slot boundary of a second slot of the set of resources subsequent to the first slot, the second temporal distance is greater than the first temporal distance.

Aspect 10: The method of any of aspects 1 through 9, further comprising: transmitting a CPE subsequent to the second LBT procedure and prior to a beginning slot of the second sidelink signal based at least in part on a success of the second LBT procedure.

Aspect 11: The method of any of aspects 1 through 8, wherein the first LBT procedure occurs over a first contention window and the second LBT procedure occurs over a second contention window, the first contention window being longer than the second contention window.

Aspect 12: A method for wireless communication at a first UE, comprising: receiving, from a second UE, a sidelink signal including an indication of a set of resources that are reserved by the second UE for second sidelink communications; monitoring the set of resources based at least in part on the indication; detecting a portion of available resources of the set of resources based at least in part on the monitoring, wherein the portion of available resources are available for the first UE to use for first sidelink communications based on overbooking by the second UE, and wherein the portion of available resources follow an end of the second sidelink communications by the second UE; and performing at least one LBT procedure over the portion of available resources based at least in part on the detecting.

Aspect 13: The method of aspect 12, further comprising: selecting the set of resources based at least in part on a received power associated with the sidelink signal satisfying a threshold for reserving overbooked resources, wherein monitoring the set of resources is based at least in part on the selection.

Aspect 14: The method of aspect 13, wherein selecting the set of resources is further based at least in part on the set of resources comprising resources that are overbooked by the second UE.

Aspect 15: The method of any of aspects 12 through 14, wherein receiving the sidelink signal comprises: receiving, via the sidelink signal, SCI including a first TDRA corresponding to the second sidelink communications by the second UE and an overbooking indication, wherein detecting the portion of available resources is based at least in part on the SCI.

Aspect 16: The method of aspect 15, wherein the overbooking indication comprises a persistence ratio indicating a ratio between a second TDRA corresponding to an entirety of the set of resources and the first TDRA corresponding to the second sidelink communications by the second UE.

Aspect 17: The method of aspect 15, wherein the overbooking indication comprises a second TDRA corresponding to an entirety of the set of resources.

Aspect 18: The method of any of aspects 12 through 17, wherein performing the at least one LBT procedure is based at least in part on a HARQ state associated with a second sidelink signal to be transmitted by the first UE.

Aspect 19: The method of any of aspects 12 through 18, wherein performing the at least one LBT procedure comprises: performing a second LBT procedure of the at least one LBT procedure based at least in part on a failure of a first LBT procedure of the at least one LBT procedure, wherein the first LBT procedure and the second LBT procedure are performed over respective consecutive slots, each slot of the respective consecutive slots comprising at least one resource of the portion of available resources.

Aspect 20: The method of aspect 19, wherein the first LBT procedure occurs at a first temporal distance from a first slot boundary of a first slot of the portion of available resources and the second LBT procedure occurs at a second temporal distance from a second slot boundary of a second slot of the portion of available resources subsequent to the first slot, the second temporal distance is greater than the first temporal distance.

Aspect 21: The method of aspect 20, further comprising: transmitting a CPE subsequent to the second LBT procedure and based at least in part on a success of the second LBT procedure.

Aspect 22: The method of aspect 19, wherein the first LBT procedure occurs over a first contention window and the second LBT procedure occurs over a second contention window, the first contention window being longer than the second contention window.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a first UE, comprising a processor; memory coupled with the processor; and instructions stored in the memory and executable by the processor to cause the apparatus to perform a method of any of aspects 12 through 22.

Aspect 27: An apparatus for wireless communication at a first UE, comprising at least one means for performing a method of any of aspects 12 through 22.

Aspect 28: A non-transitory computer-readable medium storing code for wireless communication at a first UE, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which case disks may reproduce data magnetically, whereas discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      transmit a first sidelink signal including an indication of a set of resources that are reserved by the UE for sidelink communications and including an overbooking indication that indicates a quantity of overbooked resources in the set of resources;
      perform at least two listen-before-talk (LBT) procedures over respective consecutive slots based at least in part on the overbooking indication, each slot of the respective consecutive slots comprising at least one resource of the set of resources reserved by the UE for sidelink communications, wherein a second LBT procedure of the at least two LBT procedures is performed based at least in part on a failure of a first LBT procedure of the at least two LBT procedures; and
      transmit a second sidelink signal over a portion of the set of resources following the at least two LBT procedures, wherein a remaining portion of the set of resources is released after transmitting the second sidelink signal, the remaining portion following transmission of the second sidelink signal.

2. The apparatus of claim 1, wherein the instructions to transmit the first sidelink signal are executable by the one or more processors to cause the apparatus to:
   transmit, via the first sidelink signal, sidelink control information including a first time domain resource allocation corresponding to the second sidelink signal and the overbooking indication.

3. The apparatus of claim 2, wherein the overbooking indication comprises a persistence ratio indicating a ratio between a second time domain resource allocation corresponding to an entirety of the set of resources and the first time domain resource allocation corresponding to the second sidelink signal.

4. The apparatus of claim 3, wherein the persistence ratio is based at least in part on a historical LBT failure rate associated with the UE.

5. The apparatus of claim 4, wherein the historical LBT failure rate is based at least in part on a channel busy ratio associated with one or more of sidelink signals from one or more other UEs.

6. The apparatus of claim 5, wherein the UE is associated with a first radio access technology and the channel busy ratio is adjusted to exclude traffic from radio access technologies other than the first radio access technology.

7. The apparatus of claim 2, wherein the overbooking indication comprises a second time domain resource allocation corresponding to an entirety of the set of resources.

8. The apparatus of claim 1, wherein performing the at least two LBT procedures is further based at least in part on a hybrid automatic repeat request state associated with the second sidelink signal.

9. The apparatus of claim 1, wherein:
   the first LBT procedure occurs at a first temporal distance from a first slot boundary of a first slot of the set of resources and the second LBT procedure occurs at a second temporal distance from a second slot boundary of a second slot of the set of resources subsequent to the first slot, and
   the second temporal distance is greater than the first temporal distance.

10. The apparatus of claim 1, wherein the instructions are further executable by the one or more processors to cause the apparatus to:
   transmit a cyclic prefix extension subsequent to the second LBT procedure and prior to a beginning slot of the second sidelink signal based at least in part on a success of the second LBT procedure.

11. The apparatus of claim 1, wherein the first LBT procedure occurs over a first contention window and the second LBT procedure occurs over a second contention window, the first contention window being longer than the second contention window.

12. An apparatus for wireless communication at a first user equipment (UE), comprising:
   one or more processors;
   one or more memories coupled with the one or more processors; and
   instructions stored in the one or more memories and executable by the one or more processors to cause the apparatus to:
      receive, from a second UE, a sidelink signal including an indication of a set of resources that are reserved by the second UE for second sidelink communications and including an overbooking indication;
      monitor the set of resources based at least in part on the indication of the set of resources;
      detect a portion of available resources of the set of resources based at least in part on the monitoring, wherein the portion of available resources are available for the first UE to use for first sidelink communications based on the overbooking indication, and wherein the portion of available resources follow an end of the second sidelink communications by the second UE; and
      perform at least one listen-before-talk (LBT) procedure over the portion of available resources based at least in part on the detecting.

13. The apparatus of claim 12, wherein the instructions are further executable by the one or more processors to cause the apparatus to:
   select the set of resources based at least in part on a received power associated with the sidelink signal satisfying a threshold for reserving overbooked resources, wherein monitoring the set of resources is based at least in part on the selection.

14. The apparatus of claim 13, wherein selecting the set of resources is further based at least in part on the set of resources comprising resources that are overbooked by the second UE.

15. The apparatus of claim 12, wherein the instructions to receive the sidelink signal are executable by the one or more processors to cause the apparatus to:
   receive, via the sidelink signal, sidelink control information including a first time domain resource allocation corresponding to the second sidelink communications by the second UE, wherein detecting the portion of available resources is based at least in part on the sidelink control information.

16. The apparatus of claim 15, wherein the overbooking indication comprises a persistence ratio indicating a ratio between a second time domain resource allocation corresponding to an entirety of the set of resources and the first time domain resource allocation corresponding to the second sidelink communications by the second UE.

17. The apparatus of claim 15, wherein the overbooking indication comprises a second time domain resource allocation corresponding to an entirety of the set of resources.

18. The apparatus of claim 12, wherein performing the at least one LBT procedure is based at least in part on a hybrid automatic repeat request state associated with a second sidelink signal to be transmitted by the first UE.

19. The apparatus of claim 12, wherein the instructions to perform the at least one LBT procedure are executable by the one or more processors to cause the apparatus to:
   perform a second LBT procedure of the at least one LBT procedure based at least in part on a failure of a first LBT procedure of the at least one LBT procedure, wherein the first LBT procedure and the second LBT procedure are performed over respective consecutive slots, each slot of the respective consecutive slots comprising at least one resource of the portion of available resources.

20. The apparatus of claim 19, wherein:
   the first LBT procedure occurs at a first temporal distance from a first slot boundary of a first slot of the portion of available resources and the second LBT procedure occurs at a second temporal distance from a second slot boundary of a second slot of the portion of available resources subsequent to the first slot, and
   the second temporal distance is greater than the first temporal distance.

21. The apparatus of claim 20, wherein the instructions are further executable by the one or more processors to cause the apparatus to:
   transmit a cyclic prefix extension subsequent to the second LBT procedure and based at least in part on a success of the second LBT procedure.

22. The apparatus of claim 19, wherein the first LBT procedure occurs over a first contention window and the second LBT procedure occurs over a second contention window, the first contention window being longer than the second contention window.

23. A method for wireless communication at a user equipment (UE), comprising:
   transmitting a first sidelink signal including an indication of a set of resources that are reserved by the UE for sidelink communications and including an overbooking indication that indicates a quantity of overbooked resources in the set of resources;
   performing at least two listen-before-talk (LBT) procedures over respective consecutive slots based at least in part on the overbooking indication, each slot of the respective consecutive slots comprising at least one resource of the set of resources reserved by the UE for sidelink communications, wherein a second LBT procedure of the at least two LBT procedures is performed based at least in part on a failure of a first LBT procedure of the at least two LBT procedures; and
   transmitting a second sidelink signal over a portion of the set of resources following the at least two LBT procedures, wherein a remaining portion of the set of resources is released after transmitting the second sidelink signal, the remaining portion following transmission of the second sidelink signal.

24. The method of claim 23, wherein transmitting the first sidelink signal comprises:
   transmitting, via the first sidelink signal, sidelink control information including a first time domain resource allocation corresponding to the second sidelink signal and the overbooking indication.

25. The method of claim 23, wherein the performing the at least two LBT procedures is further based at least in part on a hybrid automatic repeat request state associated with the second sidelink signal.

26. The method of claim 23, further comprising:
transmitting a cyclic prefix extension subsequent to the second LBT procedure and prior to a beginning slot of the second sidelink signal based at least in part on a success of the second LBT procedure.

27. A method for wireless communication at a first user equipment (UE), comprising:
receiving, from a second UE, a sidelink signal including an indication of a set of resources that are reserved by the second UE for second sidelink communications and including an overbooking indication;
monitoring the set of resources based at least in part on the indication;
detecting a portion of available resources of the set of resources based at least in part on the monitoring, wherein the portion of available resources are available for the first UE to use for first sidelink communications based on the overbooking indication, and wherein the portion of available resources follow an end of the second sidelink communications by the second UE; and
performing at least one listen-before-talk (LBT) procedure over the portion of available resources based at least in part on the detecting.

28. The method of claim 27, further comprising:
selecting the set of resources based at least in part on a received power associated with the sidelink signal satisfying a threshold for reserving overbooked resources, wherein monitoring the set of resources is based at least in part on the selection.

29. The method of claim 27, wherein receiving the sidelink signal comprises:
receiving, via the sidelink signal, sidelink control information including a first time domain resource allocation corresponding to the second sidelink communications by the second UE, wherein detecting the portion of available resources is based at least in part on the sidelink control information.

30. The method of claim 27, wherein performing the at least one LBT procedure is based at least in part on a hybrid automatic repeat request state associated with a second sidelink signal to be transmitted by the first UE.

* * * * *